(12) United States Patent
Ryu et al.

(10) Patent No.: US 12,185,349 B2
(45) Date of Patent: Dec. 31, 2024

(54) METHOD AND APPARATUS FOR MEASURING LINK BETWEEN TERMINALS IN WIRELESS COMMUNICATION SYSTEM

(71) Applicant: Samsung Electronics Co., Ltd., Suwon-si (KR)

(72) Inventors: Hyunseok Ryu, Suwon-si (KR); Sungjin Park, Suwon-si (KR); Jonghyun Bang, Suwon-si (KR); Jeongho Yeo, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 553 days.

(21) Appl. No.: 17/275,421

(22) PCT Filed: Sep. 11, 2019

(86) PCT No.: PCT/KR2019/011861
§ 371 (c)(1),
(2) Date: Mar. 11, 2021

(87) PCT Pub. No.: WO2020/055184
PCT Pub. Date: Mar. 19, 2020

(65) Prior Publication Data
US 2022/0053513 A1    Feb. 17, 2022

(30) Foreign Application Priority Data

Sep. 14, 2018  (KR) .................. 10-2018-0110460
Apr. 2, 2019   (KR) .................. 10-2019-0038716

(51) Int. Cl.
*H04W 72/542*   (2023.01)
*H04L 1/00*     (2006.01)
(Continued)

(52) U.S. Cl.
CPC ......... *H04W 72/542* (2023.01); *H04L 1/0026* (2013.01); *H04L 5/0051* (2013.01); *H04W 72/1263* (2013.01); *H04W 92/18* (2013.01)

(58) Field of Classification Search
None
See application file for complete search history.

(56) References Cited

U.S. PATENT DOCUMENTS

2016/0135181 A1    5/2016  Nogami et al.
2017/0048041 A1    2/2017  Yi et al.
(Continued)

FOREIGN PATENT DOCUMENTS

CN    107409267 A    11/2017
CN    107995605 A    5/2018
(Continued)

OTHER PUBLICATIONS

Ericsson, 'Physical layer design of NR sidelink', R1-1809302, 3GPP TSG RAN WG1 Meeting #94, Gothenburg, Sweden, Aug. 10, 2018.
(Continued)

*Primary Examiner* — Liem H. Nguyen
(74) *Attorney, Agent, or Firm* — Jefferson IP Law, LLP

(57) ABSTRACT

According to an embodiment of the present disclosure, an operating method of a first terminal for measuring sidelink channel quality in a wireless communication system includes: receiving system information from a base station; transmitting, to a second terminal, a sidelink channel state information-reference signal (CSI-RS) in a physical sidelink shared channel (PSSCH), based on the system information; and receiving a CSI report from the second terminal, based on the sidelink CSI-RS.

15 Claims, 24 Drawing Sheets

(51) Int. Cl.
*H04L 5/00* (2006.01)
*H04W 72/1263* (2023.01)
*H04W 92/18* (2009.01)

(56) References Cited

U.S. PATENT DOCUMENTS

| | | | |
|---|---|---|---|
| 2018/0139706 A1* | 5/2018 | Li | H04W 72/542 |
| 2018/0206176 A1* | 7/2018 | Panteleev | H04W 28/04 |
| 2018/0227886 A1 | 8/2018 | Chou et al. | |
| 2018/0242381 A1 | 8/2018 | Wei et al. | |
| 2019/0090218 A1 | 3/2019 | Noh et al. | |
| 2019/0173612 A1 | 6/2019 | Kimura et al. | |
| 2019/0364590 A1* | 11/2019 | Sartori | H04W 72/23 |
| 2019/0387409 A1* | 12/2019 | Thangarasa | H04W 16/00 |
| 2020/0028657 A1* | 1/2020 | Bharadwaj | H04B 7/063 |
| 2020/0053734 A1* | 2/2020 | Aiba | H04W 52/367 |
| 2020/0092685 A1* | 3/2020 | Fehrenbach | H04W 72/23 |
| 2020/0154404 A1* | 5/2020 | Göktepe | H04L 1/1812 |
| 2021/0076236 A1* | 3/2021 | Kimura | H04W 24/08 |
| 2021/0160014 A1* | 5/2021 | Selvanesan | H04W 76/27 |
| 2021/0235544 A1* | 7/2021 | Lee | H04L 5/0053 |
| 2021/0297199 A1* | 9/2021 | Miao | H04L 5/0048 |
| 2021/0297221 A1* | 9/2021 | Lee | H04L 1/1812 |
| 2023/0018092 A1* | 1/2023 | Ji | H04L 1/1887 |
| 2023/0040458 A1* | 2/2023 | Ji | H04W 76/27 |

FOREIGN PATENT DOCUMENTS

| | | |
|---|---|---|
| CN | 108141900 A | 6/2018 |
| JP | 2018-029323 A | 2/2018 |
| WO | WO-2016163972 A1 * | 10/2016 |
| WO | 2017/171523 A1 | 10/2017 |

OTHER PUBLICATIONS

Vivo, 'Considerations on sidelink unicast, groupcast and broadcast', R1-1808242, 3GPP TSG RAN WG1 Meeting #94, Gothenburg, Sweden, Aug. 10, 2018.
International Search Report and Written Opinion dated Dec. 20, 2019, issued in International Patent Application No. PCT/KR2019/011861.
Samsung, "DMRS configuration for PSSCH and PSCCH", 3GPP Draft, R1-164754, 3rd Generation Partnership Project (3GPP), vol. RAN WG1, Nanjing, May 23, 2016-May 27, 2016, May 13, 2016, XP051096852.
Extended European Search Report dated Oct. 11, 2021, issued in European Patent Application No. 19860403.5.
Chinese Office Action dated Aug. 17, 2023, issued in Chinese Patent Application No. 201980060276.X.
European Office Action dated Oct. 19, 2023, issued in European Patent Application No. 19860403.5.
Chinese Office Action dated Jan. 26, 2024, issued in Chinese Patent Application No. 201980060276.X.
Chinese Office Action dated Jun. 1, 2024, issued in Chinese Patent Application No. 201980060276.X.

* cited by examiner

FIG. 17
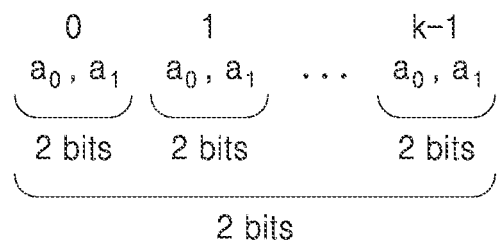
(a) MEASUREMENT INDICATION EXAMPLE: FOR UNICAST
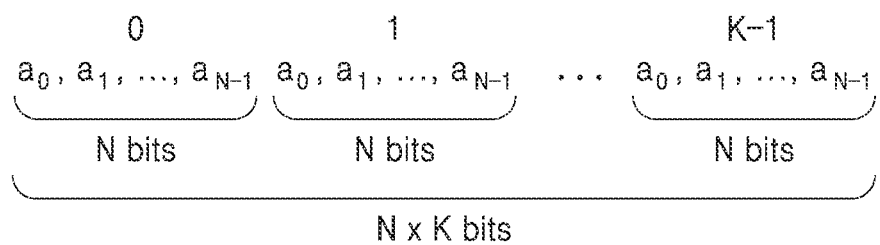
(b) MEASUREMENT INDICATION EXAMPLE: FOR GROUPCAST
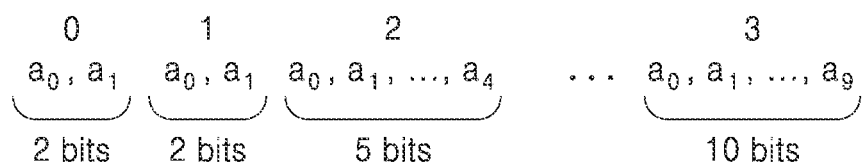
(c) MEASUREMENT INDICATION EXAMPLE: FOR UNICAST AND GROUPCAST
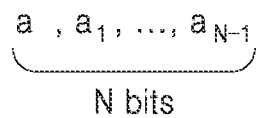
(d) MEASUREMENT INDICATION EXAMPLE: FOR UNICAST AND GROUPCAST

METHOD AND APPARATUS FOR MEASURING LINK BETWEEN TERMINALS IN WIRELESS COMMUNICATION SYSTEM

TECHNICAL FIELD

The present disclosure relates to a method of measuring a link between terminals in a wireless communication system, and more particularly, to a method and apparatus for measuring sidelink channel quality by using a signal transmitted via a sidelink channel between terminals.

BACKGROUND ART

In order to meet the increasing demand with respect to wireless data traffic after the commercialization of $4^{th}$ generation (4G) communication systems, efforts have been made to develop enhanced $5^{th}$ generation (5G) communication systems or pre-5G communication systems. For this reason, 5G communication systems or pre-5G communication systems are called 'beyond 4G network communication systems' or 'post long term evolution (LTE) systems'. 5G communication systems defined by the $3^{rd}$ generation partnership project (3GPP) are called new radio (NR) systems. In order to achieve a high data rate, consideration is given to implementing 5G communication systems in ultra-high frequency bands (millimeter wave (mmW)) (e.g., 60 GHz). In order to reduce the path loss of radio waves and increase a transmission distance of radio waves in ultra-high frequency bands, for 5G communication systems, technologies such as beamforming, massive multiple-input multiple-output (MIMO), full dimensional MIMO (FD-MIMO), array antenna, analog beamforming, and large scale antenna have been discussed, and have been applied to NR systems. Also, in order to improve system networks, for 5G communication systems, technologies such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation have been developed. Furthermore, for 5G communication systems, advanced coding modulation (ACM) schemes such as hybrid frequency-shift keying (FSK) and quadrature amplitude modulation (QAM) modulation (FQAM) and sliding window superposition coding (SWSC) and enhanced network access schemes such as filter-bank multi-carrier (FBMC), non-orthogonal multiple access (NOMA), and sparse code multiple access (SCMA) have been developed.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Accordingly, various attempts have been made to apply 5G communication systems to IoT networks. For example, technologies such as sensor network, M2M communication, and MTC are implemented by 5G communication technologies such as beamforming, MIMO, and array antenna. The application of a cloud RAN as big data processing technology may also be considered as an example of convergence between 5G technology and IoT technology.

As various services may be provided with the development of mobile communication systems, methods of effectively providing such services are required.

DESCRIPTION OF EMBODIMENTS

Technical Problem

The present disclosure relates to a method and apparatus for measuring sidelink channel quality by using a signal transmitted through a sidelink channel between terminals.

Solution to Problem

According to an embodiment of the present disclosure, an operating method of a first terminal for measuring sidelink channel quality in a wireless communication system includes: receiving system information from a base station; transmitting, to a second terminal, a sidelink channel state information-reference signal (CSI-RS) in a physical sidelink shared channel (PSSCH), based on the system information; and receiving a CSI report from the second terminal, based on the sidelink CSI-RS.

Also, the sidelink CSI-RS may be for measuring at least one of reference signal received power (RSRP), channel quality information (CQI), a rank indicator (RI), a precoder matrix indicator (PMI), a CSI-RS resource index (CRI), or a layer indicator (LI).

Also, the system information may include resource configuration information for determining a transmission bandwidth of the PSSCH, wherein the transmitting includes transmitting, to the second terminal, the sidelink CSI-RS within the transmission bandwidth of the PSSCH indicated by the resource configuration information.

Also, the sidelink CSI-RS may be generated based on a destination ID for sidelink communication or scrambled by using the destination ID.

Also, the operating method may further include transmitting a physical sidelink control channel (PSCCH), wherein the transmitting includes transmitting, to the second terminal, the sidelink CSI-RS within a transmission bandwidth of the PSSCH indicated by the PSCCH.

The operating method may further include transmitting the received CSI report to the base station by using a medium access control (MAC) control element (CE) or a physical uplink control channel (PUCCH).

According to an embodiment of the present disclosure, an operating method of a second terminal for measuring sidelink channel quality in a wireless communication system includes: receiving, from a first terminal, a sidelink channel state information-reference signal (CSI-RS) in a physical sidelink shared channel (PSSCH); measuring channel state information (CSI) based on the sidelink CSI-RS; and transmitting, to the first terminal, a CSI report based on a measurement result of the CSI.

Also, the measuring of the CSI may include measuring at least one of reference signal received power (RSRP), channel quality information (CQI), a rank indicator (RI), a precoder matrix indicator (PMI), a CSI-RS resource index (CRI), or a layer indicator (LI) based on the sidelink CSI-RS.

According to an embodiment of the present disclosure, a first terminal for measuring sidelink channel quality in a wireless communication system includes: a transceiver; and at least one processor connected to the transceiver, wherein the at least one processor is configured to receive system information from a base station, transmit, to a second terminal, a sidelink channel state information-reference signal (CSI-RS) in a physical sidelink shared channel (PSSCH), based on the system information, and receive a CSI report from the second terminal, based on the sidelink CSI-RS.

Also, the sidelink CSI-RS may be for measuring at least one of reference signal received power (RSRP), channel quality information (CQI), a rank indicator (RI), a precoder matrix indicator (PMI), a CSI-RS resource index (CRI), or a layer indicator (LI).

Also, the system information may include resource configuration information for determining a transmission bandwidth of the PSSCH, wherein the at least one processor is further configured to transmit, to the second terminal, the sidelink CSI-RS within the transmission bandwidth of the PSSCH indicated by the resource configuration information.

Also, the sidelink CSI-RS may be generated based on a destination ID for sidelink communication or scrambled by using the destination ID.

Also, the at least one processor may be further configured to transmit a physical sidelink control channel (PSCCH), and transmit, to the second terminal, the sidelink CSI-RS within a transmission bandwidth of the PSSCH indicated by the PSCCH.

Also, the at least one processor may be further configured to transmit the received CSI report to the base station by using a medium access control (MAC) control element (CE) or a physical uplink control channel (PUCCH).

A second terminal for measuring sidelink channel quality in a wireless communication system includes:
a transceiver; and at least one processor connected to the transceiver, wherein the at least one processor is configured to receive, from a first terminal, a sidelink channel state information-reference signal (CSI-RS) in a physical sidelink shared channel (PSSCH), measure channel state information (CSI) based on the sidelink CSI-RS, and transmit, to the first terminal, a CSI report based on a measurement result of the CSI.

BRIEF DESCRIPTION OF DRAWINGS

FIG. 17 is a diagram illustrating a method of notifying a pair of a transmission terminal and a reception terminal, according to an embodiment of the present disclosure.

MODE OF DISCLOSURE

Figure 1:
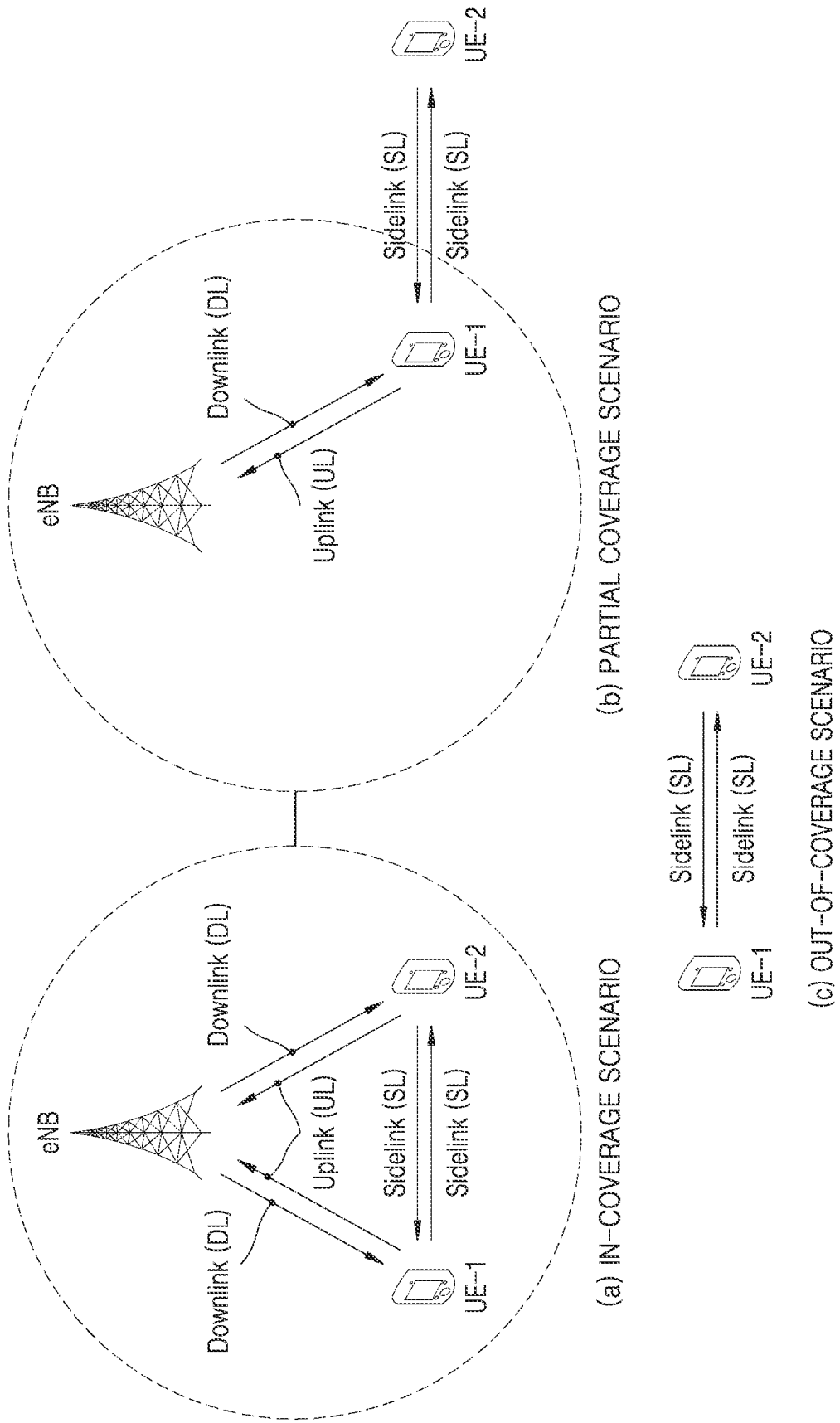
FIG. 1 is a diagram for describing a system according to an embodiment of the present disclosure.

Hereinafter, embodiments of the present disclosure will be described in detail with reference to the accompanying drawings.

In the following description of embodiments, descriptions of techniques that are well known in the art and not directly related to the present disclosure are omitted. This is to clearly convey the gist of the present disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present disclosure and methods of achieving them will become apparent with reference to embodiments of the present disclosure described in detail below along with the attached drawings. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the scope of the present disclosure is defined only by the accompanying claims. In the specification, the same reference numerals denote the same elements.

In this case, it will be understood that each block of flowchart illustrations and combinations of blocks in the flowchart illustrations may be implemented by computer program instructions. Because these computer program instructions may be loaded into a processor of a general-purpose computer, a special purpose computer, or a programmable data processing device, the instructions, which are executed via the processor of the computer or another programmable data processing device, generate means for implementing functions described in the flowchart block(s). Because these computer program instructions may also be stored in a computer-usable or computer-readable memory that may direct a computer or another programmable data processing device to function in a particular manner, the instructions stored in the computer-usable or computer-readable memory may produce manufacturing items including instruction means that implement the functions described in the flowchart block(s). Because the computer program instructions may also be loaded into a computer or another programmable data processing device, a series of operational steps may be performed on the computer or other programmable device to produce a computer implemented process, and thus the instructions executed on the computer or other programmable device may provide steps for implementing the functions described in the flowchart block(s).

Also, each block of the flowchart illustrations may represent a module, segment, or portion of code, which includes one or more executable instructions for implementing specified logical function(s). It should also be noted that in some alternative implementations, functions noted in blocks may occur out of order. For example, two blocks shown in succession may actually be executed substantially concurrently or the blocks may sometimes be executed in a reverse order, depending upon the functionality involved.

In this case, the term "~ unit" used in the present embodiment refers to a software or hardware component, such as a field-programmable gate array (FPGA) or an application-specific integrated circuit (ASIC), which performs certain tasks. However, the term "~ unit" is not limited to software or hardware. The term "~ unit" may be configured to be in an addressable storage medium or configured to operate one or more processors. Thus, "~ unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~ units" may be combined into fewer components and "~ units", or may be further separated into additional components and "~ units". Further, components and "~ units" may be implemented to operate one or more central processing units (CPUs) in a device or a secure multimedia card. Also, a "~ unit" in an embodiment may include one or more processors.

Embodiments of the present disclosure will be described mainly based on a new radio access network (RAN) (new radio (NR)) on the $5^{th}$ generation (5G) mobile communication standard specified by the $3^{rd}$ generation partnership project (3GPP) that is a standardization organization for mobile communication standards, and a packet core (5G system, 5G core network, or next generation (NG) core) that is a core network. However, it will be obvious to one of ordinary skill in the art that the main subject matter of the present disclosure is applicable to other communication systems having a similar technical background, with a slight modification within a range that is not significantly outside the scope of the present disclosure.

In the 5G system, a network data collection and analysis function (NWDAF) that is a network function for providing a function of analyzing and providing data collected in a 5G network may be defined to support network automation. NWDAF may provide results of collecting/storing/analyzing information from the 5G network to an unspecified network function (NF), and the analysis results may be independently used in each NF.

Hereinafter, for convenience of description, some terms and names defined by the 3GPP long term evolution (LTE) standard (standard of 5G, NR, LTE, or similar system) may be used. However, the present disclosure is not limited by such terms and names, and may be equally applied to systems conforming to other standards.

Also, terms for identifying access nodes, terms denoting network entities, terms denoting messages, terms denoting interfaces between network entities, terms denoting various types of identification information, etc. used herein are exemplified for convenience of description. Thus, the terms used in the present disclosure are not limited and other terms denoting targets having the same technical meanings may be used.

To meet the increase in demand with respect to wireless data traffic after the commercialization of $4^{th}$ generation (4G) communication systems, efforts have been made to develop enhanced 5G communication systems (or new radio (NR) systems). To achieve a high data rate, 5G communication systems have been designed to support resources in ultra-high frequency bands (millimeter wave (mmWave)) (e.g., 28 GHz). In order to reduce the path loss of radio waves and increase a transmission distance of radio waves in ultra-high frequency bands, for 5G communication systems, various technologies such as beamforming, massive multiple-input multiple-output (MIMO), full dimensional MIMO (FD-MIMO), array antenna, analog beamforming, and large scale antenna have been discussed. In addition, the 5G communication systems support various subcarrier spacings including 15 kHz, 30 kHz, 60 kHz, and 120 kHz unlike LTE, wherein a physical control channel uses polar coding and a physical data channel uses low density parity check (LDPC). Also, not only discrete Fourier transform spread orthogonal frequency division multiplexing (DFT-S-OFDM), but also cyclic prefix (CP)-OFDM are used as waveforms for uplink transmission. In LTE, hybrid automatic request (HARQ) retransmission in transport block (TB) units is supported, whereas in 5G, code block group (CBG)-based HARQ retransmission in which several CBs are grouped may be additionally supported.

In order to improve system networks, for 5G communication systems, various technologies such as evolved small cell, advanced small cell, cloud radio access network (cloud RAN), ultra-dense network, device-to-device (D2D) communication, wireless backhaul, vehicle-to-everything (V2X) network, cooperative communication, coordinated multi-points (CoMP), and interference cancellation have been developed.

The Internet is evolving from a human-centered connection network through which humans create and consume information to an Internet of things (IoT) network through which distributed elements such as objects exchange and process information. Internet of everything (IoE) technology, which is a combination of IoT technology and big data processing technology through connection with a cloud server, is also emerging. In order to implement the IoT, various technological components such as sensing technology, wired/wireless communication and network infrastructure, service interface technology, and security technology are required, and thus technology for inter-object connection, such as sensor network, machine to machine (M2M) communication, or machine-type communication (MTC), has recently been studied. In an IoT environment, intelligent information technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Accordingly, various attempts have been made to apply 5G communication systems to IoT networks. For example, technologies such as sensor network, M2M communication, and MTC are implemented by 5G communication technologies such as beamforming, MIMO, and array antenna. The application of a cloud RAN as big data processing technology may also be considered as an example of convergence between 5G communication technology and IoT technology. As such, a plurality of services may be provided to a user in a communication system, and there is a demand for a method of providing the plurality of services in the same time duration according to characteristics to provide the plurality of services to the user and an apparatus using the method. Various services provided in a 5G communication system have been studied and one of the services is a service satisfying requirements of low latency and high reliability.

In vehicle communication, standardization of LTE-based V2X in 3GPP Rel-14 and Rel-15 has been completed based on a D2D communication structure, and currently, attempts have been made to develop V2X based on 5G NR. In NR V2X, unicast communication, groupcast (or multicast) communication, or broadcast communication between terminals is to be supported. Also, unlike LTE V2X that aims at providing basic safety information transmission and reception required for driving of a vehicle, NR V2X aims at providing further advanced services such as platooning, advanced driving, extended sensor, and remote driving. To support various services and scenarios, NR V2X needs to support higher reliability and a higher data rate than conventional LTE D2D or LTE V2X. Accordingly, link adaptation based on a feedback between terminals which is not supported by LTE D2D or LTE V2X is required, and to this end, a method and apparatus for measuring the quality of a link between terminals are required.

An embodiment of the present specification provides a method and apparatus for measuring a link between terminals, to support high reliability and a high data rate.

FIG. 1 is a diagram for describing a system according to an embodiment of the present disclosure.

(a) of FIG. 1 illustrates an example where all V2X UEs UE-1 and UE-2 are located within coverage of a base station.

The all V2X UEs may receive data and control information via a downlink (DL) from the base station, or may transmit data and control information via an uplink (UL) to the base station. In this case, the data and the control information may be data and control information for V2X communication. Alternatively, the data and the control information may be data and control information for general cellular communication. Also, the V2X UEs may transmit/receive the data and the control information for V2X communication via a sidelink (SL).

(b) of FIG. 1 illustrates an example where the V2X UE UE-1 from among the V2X UEs is located within the coverage of the base station and the V2X UE UE-2 is located outside the coverage of the base station. The example of (b) of FIG. 1 may be referred to as partial coverage.

The V2X UE UE-1 located within the coverage of the base station may receive data and control information via a downlink (DL) from the base station or may transmit data and control information to the base station via an uplink (UL).

The V2X UE UE-2 located outside the coverage of the base station is unable to receive data and control information from the base station via a downlink, and is unable to transmit data and control information to the base station via an uplink.

The V2X UE UE-2 may transmit/receive data and control information for V2X communication to/from the V2X UE UE-1 via a sidelink.

(c) of FIG. 1 illustrates an example where the all V2X UE UEs are located outside the coverage of the base station.

Accordingly, the V2X UEs UE-1 and UE-2 are unable to receive data and control information from the base station via a downlink, and are unable to transmit data and control information to the base station via an uplink.

The V2X UEs UE-1 and UE-2 may transmit/receive data and control information for V2X communication via a sidelink.

Although a V2X system includes two UEs (i.e., the V2X UEs UE-1 and UE-2) for convenience of description, the present disclosure is not limited thereto. Also, an uplink and a downlink between the base station and the V2X UEs may be referred to as a Uu interface and a sidelink between the V2X UEs may be referred to as a PC5 interface. Accordingly, in the present disclosure, an uplink and a downlink and a Uu interface may be interchangeably used, and a sidelink and a PC5 interface may be interchangeably used.

Meanwhile, in the present disclosure, a UE may denote a vehicle supporting vehicle-to-vehicle (V2V) communication, a vehicle or handset (e.g., a smart phone) of a pedestrian supporting vehicle-to-pedestrian (V2P) communication, a vehicle supporting vehicle-to-network (V2N) communication, or a vehicle supporting vehicle-to-infrastructure (V2I) communication. Also, in the present disclosure, a UE may denote a road side unit (RSU) with a UE function, an RSU with a base station function, or an RSU with a part of a base station function and a part of a UE function.

Figure 2:
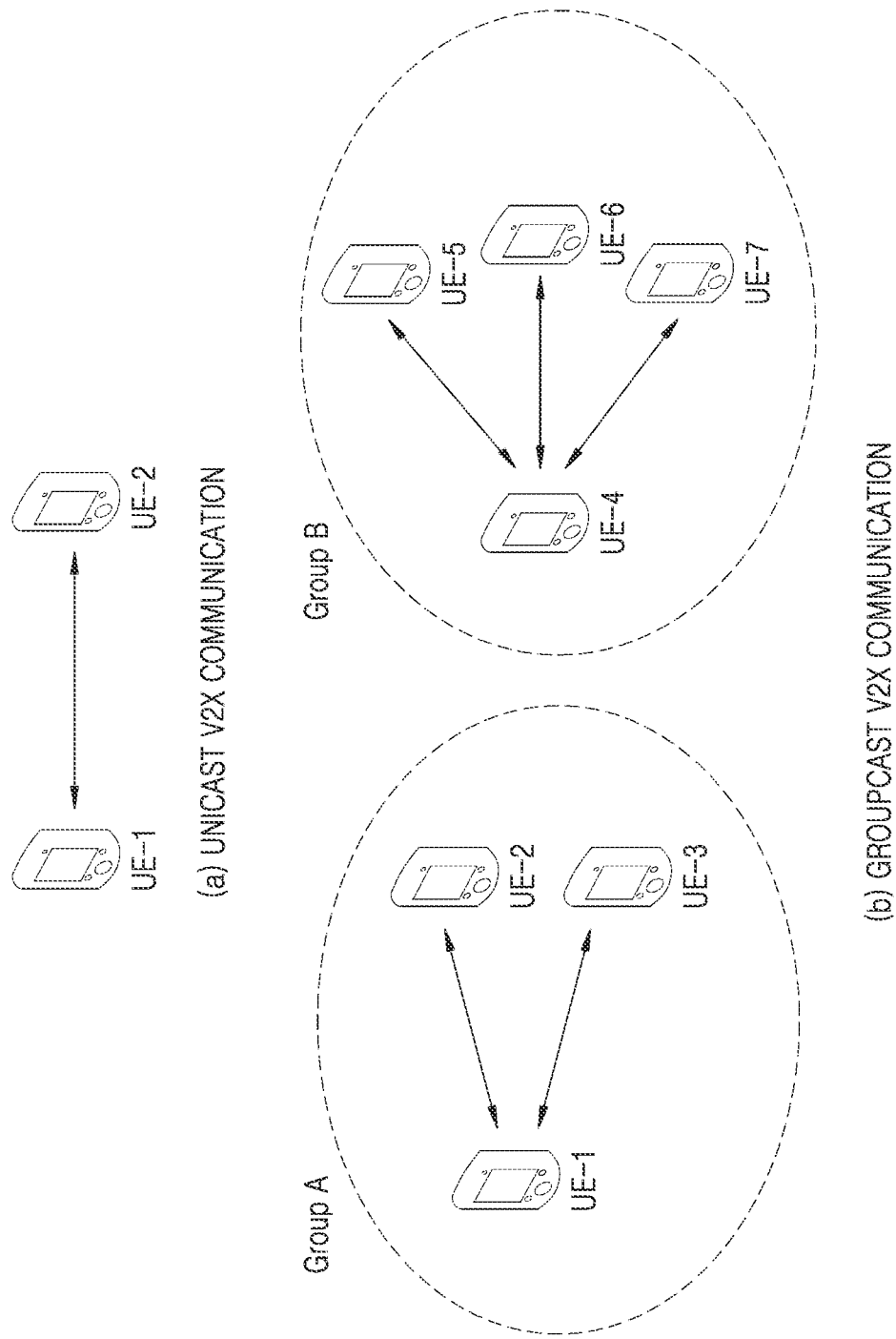
FIG. 2 is a diagram illustrating a vehicle-to-everything (V2X) communication method performed via a sidelink, according to an embodiment.

FIG. 2 is a diagram illustrating a V2X communication method performed via a sidelink, according to an embodiment.

As shown in (a) of FIG. 2, a transmission (TX) UE and a reception (RX) UE may perform communication in a one-to-one manner, which may be referred to as unicast communication.

As shown in (b) of FIG. 2, a transmission UE and a reception UE may perform communication in a one-to-many manner, which may be referred to as groupcast or multicast communication.

In (b) of FIG. 2, UE-1, UE-2, and UE-3 may form one group, i.e., group A, to perform groupcast communication and UE-4, UE-5, UE-6, and UE-7 may form another group, i.e., group B, to perform groupcast communication. Each UE may perform groupcast communication only within a group to which it belongs, and communication between different groups is not performed. Although two groups are formed in (b) of FIG. 2, the present disclosure is not limited thereto.

Meanwhile, although not shown in FIG. 2, V2X UEs may perform broadcast communication. The broadcast communication indicates that all V2X UEs receive data and control information transmitted by a V2X transmission UE via a sidelink. For example, in (b) of FIG. 2, when UE-1 is a transmission UE for broadcast communication, all UEs (UE-2 through UE-7) may receive data and control information transmitted by UE-1.

Figure 3:
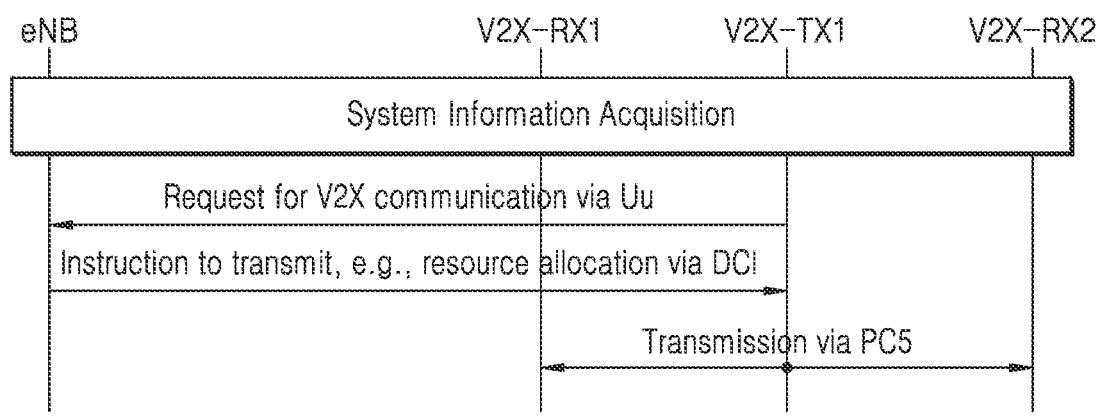
FIG. 3 is a diagram illustrating resource allocation in a V2X system, according to an embodiment.

FIG. 3 is a diagram illustrating resource allocation in a V2X system, according to an embodiment.

All V2X UEs connected to an eNB may obtain system information through a system information block (SIB) from the eNB. In this case, the system information may include resource pool information for V2X communication.

In FIG. 3, V2X-TX1 may denote a V2X transmission UE that is to perform V2X communication. The V2X transmission UE TX1 may request the eNB for resource allocation for V2X transmission via a Uu interface.

The eNB may transmit control information for sidelink transmission of the V2X transmission UE TX1 to the V2X transmission UE TX1 via a downlink control channel. In this case, the control information transmitted by the eNB may include resource allocation information for sidelink control information and data information transmission of the V2X transmission UE TX1.

V2X reception UEs may obtain information on resources to be received by the V2X reception UEs through the system information. For example, when a specific resource pool is configured as a reception resource pool, the V2X reception UEs may receive all V2X resources of the specific resource pool.

Figure 4:
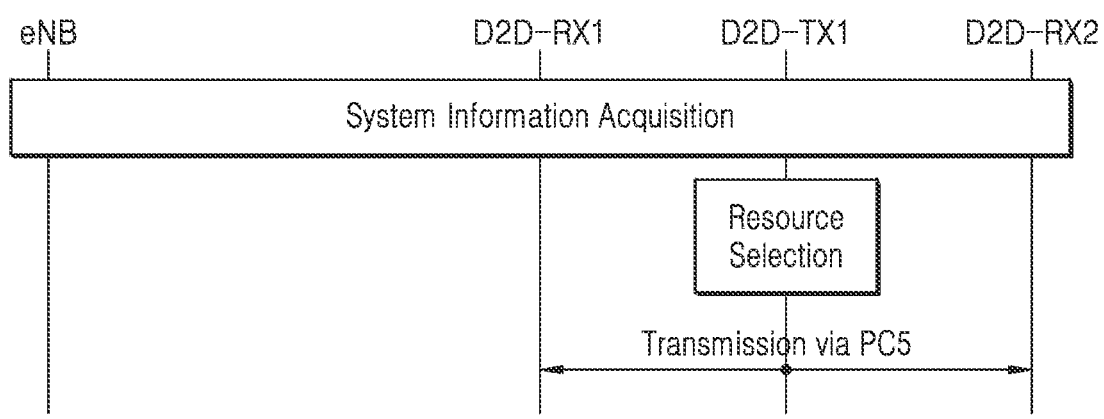
FIG. 4 is a diagram illustrating resource allocation in a V2X system, according to another embodiment.

FIG. 4 is a diagram illustrating resource allocation in a V2X system, according to another embodiment.

Unlike in FIG. 3, in FIG. 4, an eNB may transmit information on a transmission resource pool and a reception resource pool, which may be used by V2X UEs, to UEs through system information.

UEs which are to transmit V2X data, from among the UEs receiving the information, may randomly select one of resources in the transmission resource pool and may transmit V2X control information and data information. Alternatively, the UEs which are to transmit V2X data may select a transmission resource according to a determined rule.

For example, when a V2X transmission UE senses a V2X transmission resource pool for a determined duration and it is determined that a specific resource is not occupied by another UE, the V2X transmission UE may transmit V2X control information and data information in the specific resource.

When a specific resource pool is configured as a reception resource pool, V2X reception UEs may receive all V2X resources of the specific resource pool, as described with reference to FIG. 3.

Figure 5:
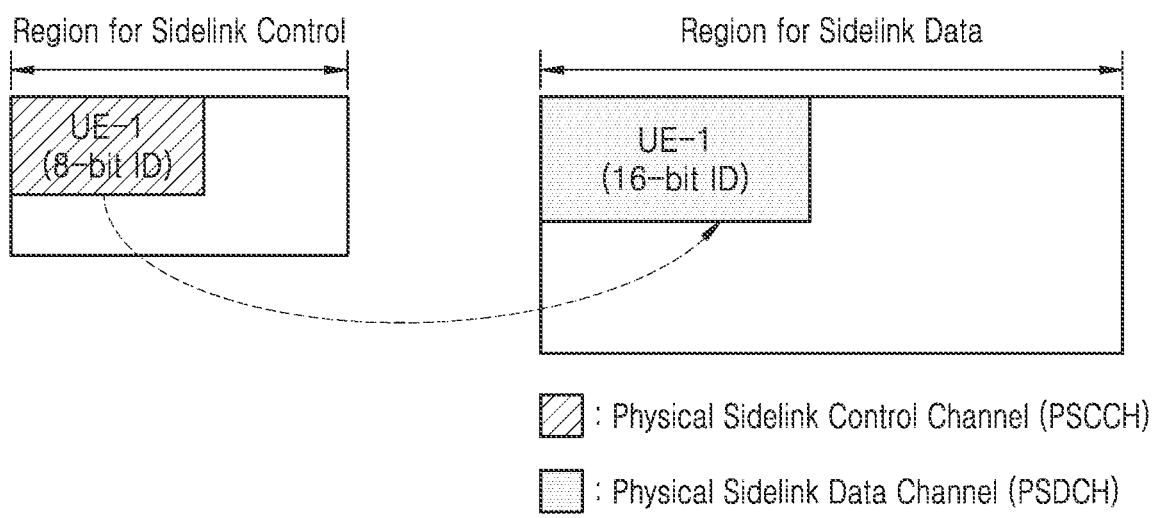
FIG. 5 is a diagram illustrating a method of supporting unicast, groupcast, and broadcast communication in a device-to-device (D2D) system, according to an embodiment.

FIG. 5 is a diagram illustrating a method of supporting unicast, groupcast, and broadcast communication in a D2D system, according to an embodiment.

In a D2D communication system, through an 8-bit group destination ID transmitted via a D2D control channel (e.g., a physical sidelink control channel (PSCCH)) and a 16-bit ID transmitted via a D2D data channel (e.g., a physical sidelink shared channel (PSSCH)), it may be determined whether D2D communication is unicast communication, groupcast communication, or broadcast communication in a higher layer.

In more detail, a D2D reception UE UE-1 may receive a D2D sidelink control channel and then may obtain an 8-bit group destination ID by performing decoding. In this case, when the 8-bit group destination ID indicates a group of the D2D reception UE UE-1, the D2D reception UE UE-1 may decode D2D data information transmitted in a time/frequency resource indicated by the D2D sidelink control channel After decoding the D2D data information, the D2D reception UE may obtain a 16-bit ID from a medium access control protocol data unit (MAC PDU) header. The D2D reception UE may determine whether the data is data transmitted to the D2D reception UE or data transmitted to another UE, through the 16-bit ID.

When the data is not data transmitted to the D2D reception UE, the D2D reception UE may discard the data without transmitting the data to a higher layer. When the above IDs (i.e., the 8-bit group destination ID+the 16-bit ID) indicate one destination, it may be considered as unicast communication, and when the above IDs indicate two or more destinations, it may be considered as groupcast communication. Also, when the above IDs indicate an unspecified majority without indicating a specific group, it may be considered as broadcast communication.

Figure 6:
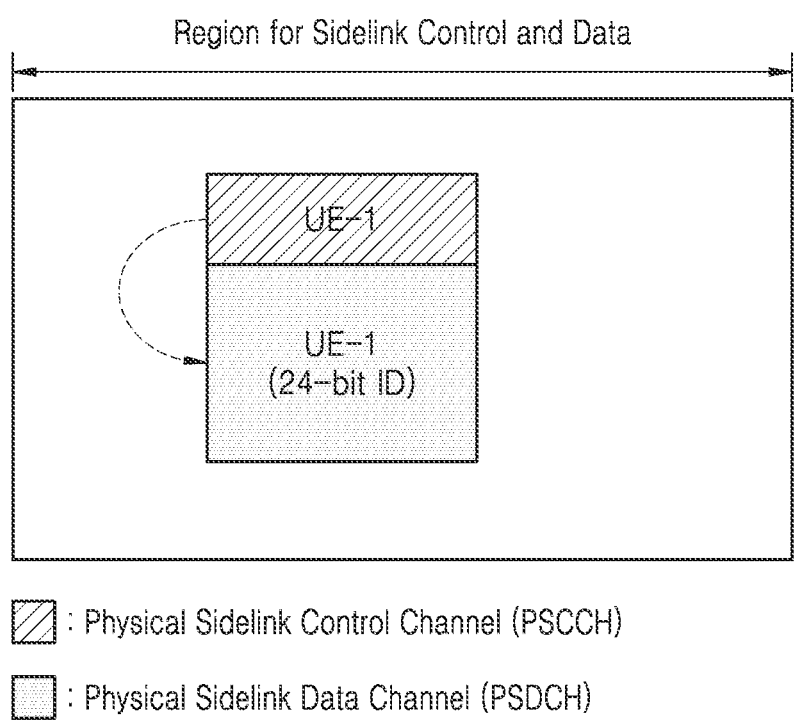
FIG. 6 is a diagram illustrating a method of supporting groupcast communication and broadcast communication in a V2X system, according to an embodiment.

FIG. 6 is a diagram illustrating a method of supporting groupcast communication and broadcast communication in a V2X system, according to an embodiment.

In a D2D system, a sidelink control channel and a sidelink data channel may be time-divided and transmitted.

In a V2X system, a sidelink control channel and a sidelink data channel may be frequency-divided and transmitted. Also, in a V2X system, unicast communication may not be supported, and an ID may not be transmitted via a sidelink control channel as shown in FIG. 5.

That is, a 24-bit ID may be transmitted via a V2X sidelink data channel, and a V2X reception UE may determine whether the data is data transmitted to the V2X reception UE or data transmitted to another UE through the 24-bit ID. When the data is not data transmitted to the V2X reception UE, the V2X reception UE may discard the data without transmitting the data to a higher layer. When the 24-bit ID indicates destinations of a specific group, it may be considered as groupcast communication, and when the 24-bit ID indicates an unspecified majority without indicating a specific group, it may be considered as broadcast communication.

Figure 7:
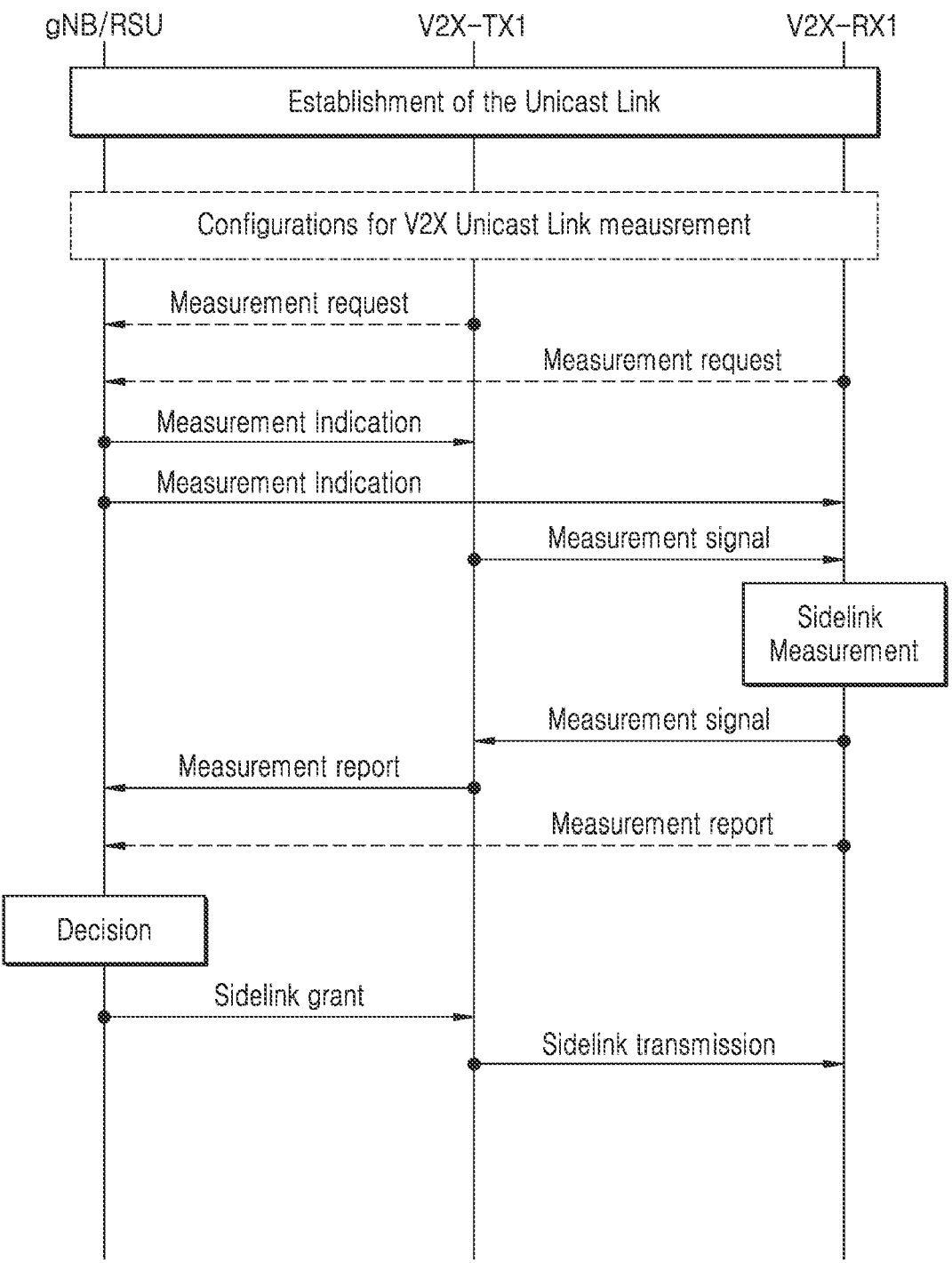
FIG. 7 is a diagram illustrating a measurement procedure for unicast communication in a V2X communication system, according to an embodiment of the present disclosure.

FIG. 7 is a diagram illustrating a measurement procedure for unicast communication in a V2X communication system, according to an embodiment of the present disclosure.

In FIG. 7, it may be assumed that a link configuration for a unicast link (i.e., pairing of a transmission UE and a reception UE for V2X unicast communication) has already been completed.

A gNB may configure information for measurement in a UE through an SIB. Alternatively, the gNB may configure information for measurement through UE-specific radio resource control (RRC)) information.

In this case, the information for measurement may include a time/frequency resource and period for measurement, and a time/frequency resource and a reporting period which the UE may report by performing measurement. In this case, the measurement may refer to at least one of reference signal received power (RSRP), channel quality information (CQI), a rank indicator (RI), a precoder matrix indicator (PMI), a CSI-RS resource index (CRI), and a layer indicator (LI).

The measurement may start through a request of a V2X transmission UE V2X-TX1 or through a request of a V2X reception UE V2X-RX1.

For example, when the V2X transmission UE is to transmit, for example, (64-quadrature amplitude modulation (QAM) or 256-QAM) sidelink data by using a specific modulation coding scheme (MCS) or more, the V2X transmission UE may make a measurement request to the gNB.

Likewise, when the V2X reception UE is to receive, for example, (64-QAM or 256-QAM) sidelink data by using a specific MCS or more, the V2X reception UE may make a measurement request to the gNB. In this case, the measurement request may be made through a MAC control element (CE), or may be made via an uplink control channel (e.g., a physical uplink control channel (PUCCH)).

Alternatively, when a strength of a reception signal of a control channel or a data channel received by the V2X reception UE from the V2X transmission UE is equal to or less than a specific threshold value, the V2X reception UE may make a measurement request to the gNB. In this case, the strength of the reception signal may be measured through a demodulation reference signal (DMRS) transmitted via the control channel or a DMRS transmitted via the data channel Information on the threshold value may be information obtained by the UE from the gNB through system information or the UE-specific RRC information, or may be a value pre-agreed between the gNB and the UE.

As another example, as shown in FIG. 7, the gNB may transmit a measurement indication to the V2X transmission UE and the reception UE in which a unicast link is configured. The gNB may transmit the measurement indication through a MAC CE or through downlink control information (DCI).

Although the gNB transmits the measurement indication to both the V2X transmission UE and the V2X reception UE in FIG. 7, the gNB may transmit the measurement indication only to the V2X transmission UE or the V2X reception UE.

When the measurement indication is transmitted only to the V2X transmission UE or transmitted to both the V2X transmission UE and the V2X reception UE, the V2X transmission UE receiving the measurement indication may transmit a measurement signal in a slot receiving the measurement indication or after a specific offset from the slot receiving the measurement indication. In this case, the measurement signal may be a sidelink synchronization signal for performing sidelink synchronization, a channel state information-reference signal (CSI-RS) for measuring sidelink channel quality, a DMRS transmitted via a sidelink control channel, or a DMRS transmitted via a sidelink data channel.

In more detail, when the measurement signal is a sidelink synchronization signal, the V2X transmission UE receiving the measurement indication through the MAC CE or the DCI from the gNB may transmit a sidelink synchronization signal in a slot receiving the measurement indication or after a specific offset from the slot receiving the measurement indication (or after a specific offset from a symbol of the slot receiving the measurement indication).

As another example, when the measurement signal is a CSI-RS for measuring sidelink channel quality, the V2X transmission UE receiving the measurement indication through the MAC CE or the DCI from the gNB may transmit a sidelink CSI-RS in a slot receiving the measurement indication or after a specific offset from the slot receiving the measurement indication (or after a specific offset from a symbol of the slot receiving the measurement indication).

As another example, when the measurement signal is a DMRS transmitted via the sidelink control channel, the V2X transmission UE receiving the measurement indication through the MAC CE or the DCI from the gNB may transmit sidelink control information in a slot receiving the measurement indication or after a specific offset from the slot receiving the measurement indication (or after a specific offset from a symbol of the slot receiving the measurement indication).

As another example, when the measurement signal is a DMRS transmitted via the sidelink data channel, the V2X transmission UE receiving the measurement indication through the MAC CE or the DCI from the gNB may transmit sidelink data information in a slot receiving the measurement indication or after a specific offset from the slot receiving the measurement indication (or after a specific offset from a symbol of the slot receiving the measurement indication).

When a sidelink measurement signal is a CSI-RS for measuring sidelink channel quality or a DMRS transmitted via the sidelink data channel, the sidelink measurement signal is always within a bandwidth of the sidelink data channel transmitted by the V2X transmission UE. That is, when there is no sidelink data transmission, the V2X transmission UE does not transmit the sidelink measurement signal. In this case, the bandwidth of the sidelink data channel may refer to a frequency width of the sidelink data channel scheduled through the DCI by the gNB for sidelink transmission. As another example, the bandwidth of the sidelink data channel may refer to a frequency width of a resource for transmitting a V2X sidelink data channel obtained by the V2X transmission UE through a sensing process in a resource pool configured through the system information or RRC from the gNB for sidelink transmission. In the above example, the sensing process may refer to energy measurement of a sidelink control channel or the sidelink data channel, or RSRP measurement from a DMRS transmitted via the sidelink control channel or the sidelink data channel. As another example, the sensing process may refer to a decoding process of control information transmitted via the sidelink control channel. As another example, the sensing process may refer to the above two operations (i.e., the energy measurement and the decoding process of control information).

The V2X reception UE may receive and decode the sidelink control information from the V2X transmission UE. The V2X reception UE may obtain time and/or frequency resource information of the sidelink data channel from the decoded control information. The V2X reception UE may indirectly derive information on a bandwidth in which the sidelink measurement signal is transmitted, through the obtained information. In this case, the V2X transmission UE may not transmit additional information on the bandwidth of the sidelink measurement signal to the V2X reception UE. As another example, the information on the bandwidth in which the sidelink measurement signal is transmitted may be transmitted by the V2X transmission UE to the V2X reception UE through the sidelink control information. Accordingly, in the above example, the V2X reception UE may decode the sidelink control information and may obtain the information on the bandwidth of the sidelink measurement signal.

When the measurement indication is transmitted only to the V2X reception UE or transmitted to both the V2X transmission UE and the reception UE, the V2X reception UE receiving the measurement indication may receive a measurement signal from the V2X transmission UE in a slot receiving the measurement indication or after a specific offset from the slot receiving the measurement indication. The V2X reception UE receiving the measurement signal may measure a sidelink measurement signal and may report a measurement result to the V2X transmission UE. In this case, information on a resource for reporting the measurement result may be explicitly included in the MAC CE or the DCI through which the measurement indication is transmitted by the gNB.

As another example, the resource for reporting the measurement result may be in a linkage or association relationship with a resource for transmitting the measurement signal. That is, the V2X reception UE receiving the measurement signal may know the information on the resource for reporting the measurement result, by using the association relationship. The V2X transmission UE transmitting the measurement signal may receive the measurement result reported by the V2X reception UE to the V2X transmission UE, by using the association relationship. The association relationship between the resource for transmitting the measurement signal and the source for reporting the measurement result may be established by using any of various methods.1 For example, the resource for reporting the measurement result may be determined by using a sequence index of the measurement single, a time resource in which the measurement signal is transmitted, a frequency resource, or a combination of the time resource and the frequency resource.

In more detail, a specific sequence index used to transmit the measurement signal may be referred to as a time resource or a frequency resource for a measurement report.

For example, the gNB may allocate a time resource for a measurement report (an index of a slot in which the measurement report is performed or a symbol index of the slot in which the measurement report is performed) to each UE through a V2X link measurement configuration. The V2X UE may determine a frequency resource in which the measurement report is performed (an index of a resource block through which the measurement report is performed) through a sequence index of the measurement signal.

In contrast, the gNB may allocate a frequency resource for a measurement report to each UE through a V2X link measurement configuration. The V2X UE may determine a time resource in which the measurement report is performed through a sequence index of the measurement signal.

As another example, without a configuration from the gNB, the V2X UE may perform the measurement report after a specific time offset (e.g., after a K symbol) from a point of time when the measurement signal is received. In this case, a frequency resource for the measurement report may be derived through at least one of a sequence index of the measurement signal, a time resource in which the measurement signal is transmitted, and a frequency resource in which the measurement signal is transmitted.

As another example, both time and frequency resources for the measurement report may be derived through at least one of a sequence index of the measurement signal, a time resource in which the measurement signal is transmitted, and a frequency resource in which the measurement signal is transmitted.

As another example, a UE transmitting the measurement signal may transmit at least one information from among a time resource or a frequency resource in which the measurement report may be performed to a UE that is to perform the measurement report.

The V2X transmission UE V2X-TX1 receiving the measurement report from the V2X reception UE V2X-RX1 may transmit the measurement report to the gNB. In this case, THE measurement result of the V2X reception UE V2X-RX1 reported by the V2X transmission UE V2X-TX1 to the gNB may be transmitted through a MAC CE or a PUCCH.

As another example, the V2X reception UE V2X-RX1 performing the measurement report may directly report the information to the gNB without reporting the information to the V2X transmission UE V2X-TX1. A resource in this case may be explicitly included in information of the measurement indication of the gNB, or may be determined by the UE through the association relationship with the measurement signal as described above.

Whether channel quality measured by the V2X reception UE is to be reported to the V2X transmission UE or to the gNB may be indicated through a measurement indication for the V2X reception UE.

As another example, the gNB may configure whether to report channel quality measured by the V2X reception UE to the V2X transmission UE or to the gNB itself in the V2X UE, through UE-specific RRC or common RRC signaling.

The gNB receiving the measurement report from the UE may perform sidelink scheduling based on the measurement report. That is, the gNB may transmit DCI for a sidelink to the V2X transmission UE, and the V2X transmission UE receiving the DCI may transmit sidelink control information and data information to the V2X reception UE.

Although the measurement signal is transmitted from the V2X transmission UE V2X-TX1 in FIG. 7, the same description may apply to a case where the measurement signal is transmitted from the V2X reception UE V2X-RX1.

Whether the measurement signal is to be transmitted by the V2X transmission UE or the V2X reception UE may be indicated by the gNB through an indicator included in the measurement indication. For example, the indicator included in the measurement indication indicates '1', a UE receiving the measurement indication may transmit the measurement signal, and when the indictor indicates '0', a UE receiving the measurement indication may receive the measurement signal. When the V2X reception UE transmits the measurement signal, the V2X transmission UE may receive the measurement signal and may measure channel quality.

Also, because unicast communication has been mainly described in FIG. 7, it has been assumed that there are one V2X transmission UE V2X-TX1 and one V2X reception UE V2X-RX1. However, procedures described with reference to FIG. 7 may be applied to groupcast communication in which there are two or more UEs. For example, when it is assumed that there is another V2X reception UE V2X-RX2, the V2X reception UE V2X-RX2 may transmit a measurement request to the gNB. The gNB may transmit a measurement indication to the V2X reception UE V2X-RX2. The V2X reception UE V2X-RX2 receiving a measurement signal from the V2X transmission UE V2X-TX1 may perform sidelink measurement like the V2X reception UE V2X-RX1, and may transmit a measurement result to the V2X transmission UE V2X-TX1 or the gNB. When the V2X transmission UE V2X-TX1 receives measurement results from two or more reception UEs (i.e., the V2X reception UEs V2X-RX1 and V2X-RX2), the V2X transmission UE V2X-TX1 may report the measurement result of each of the V2X reception UEs V2X-RX1 and V2X-RX2 to the gNB, or may multiplex the measurement results and may transmit the measurement results via one channel.

It has been assumed in FIG. 7 that both the V2X transmission UE and the V2X reception UE exist within coverage of the gNB. Also, a resource allocation method in which the V2X transmission UE operates in an RRC-connected state with the gNB (the V2X transmission UE is scheduled with a transmission resource of sidelink control information and data information from the gNB) has been assumed. However, this is merely an example, and the present disclosure is not limited thereto. The V2X transmission UE and the reception UE may operate in various situations.

For example, the V2X transmission UE may exist within the coverage of the gNB and the V2X reception UE may exist outside the coverage. As another example, the V2X transmission UE may exist within coverage of a gNB-1, and the V2X reception UE may exist within coverage of a gNB-2. In this case, the procedure of FIG. 7 may be re-used.

Both the V2X transmission UE and the V2X reception UE may exist outside the coverage of the gNB. In this case, the V2X transmission and reception UEs may not perform an RRC connection configuration with the gNB. Accordingly, in this case, in FIG. 7, an operation by which the V2X transmission and reception UEs receive configuration information for transmission of a sidelink measurement signal from the gNB may be omitted. Also, a procedure by which the V2X transmission and reception UEs request the gNB to transmit a sidelink measurement signal, a procedure by which the V2X transmission and reception UEs receive an indication for transmission of the sidelink measurement signal from the gNB, and a procedure by which the V2X transmission UE transmits a sidelink channel quality report result received from the V2X reception UE to the gNB may be omitted.

As described above, the V2X transmission UE may directly select a transmission resource through a sensing process in a pre-configured resource pool. The sidelink measurement signal may be transmitted along with data information in the transmission resource in which sidelink data information is transmitted. That is, the V2X transmission UE may determine whether there is sidelink control information and/or data information to be transmitted, and, when there is the information, may transmit the sidelink measurement signal. Otherwise, the V2X transmission UE may not transmit the sidelink measurement signal, or when there is a sidelink measurement signal that is being transmitted, may stop transmitting the sidelink measurement signal.

As another example, the V2X transmission UE may exist within the coverage of the gNB but may operate in a state where there is no RRC connection configuration with the gNB. In this case, as described above, the V2X transmission UE may directly select a transmission resource through a sensing process in a resource pool configured by the gNB. In this case, a procedure by which the V2X transmission UE requests the gNB to transmit a sidelink measurement signal, a procedure by which the V2X transmission UE receives an indication for transmission of the sidelink measurement signal from the gNB, and a procedure by which the V2X transmission UE transmits a sidelink channel quality report result received from the V2X reception UE to the gNB may be omitted.

Figure 8:
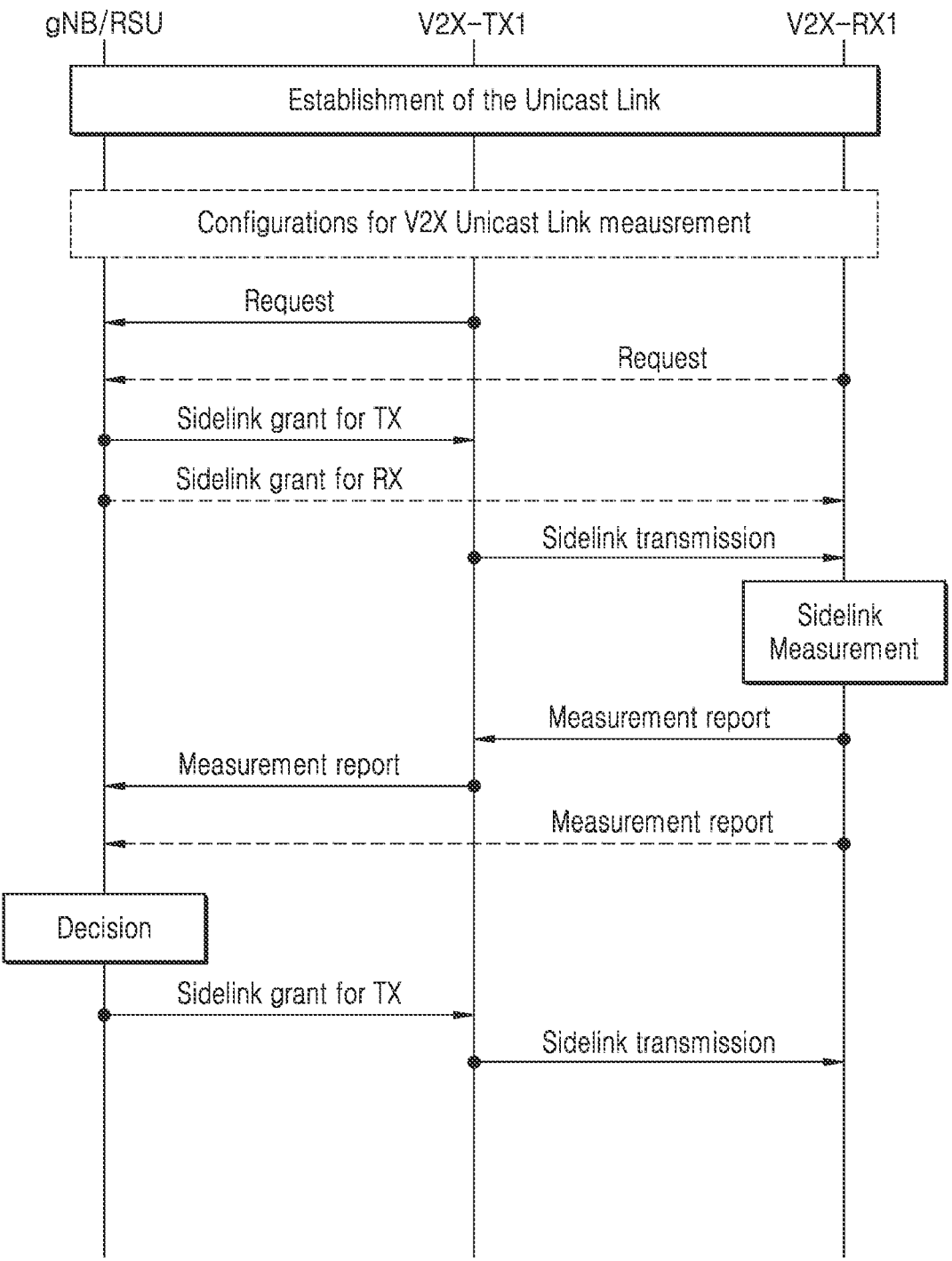
FIG. 8 is a diagram illustrating a measurement procedure for unicast communication in a V2X communication system, according to another embodiment of the present disclosure.

FIG. 8 is a diagram illustrating a measurement procedure for unicast communication in a V2X communication system, according to another embodiment of the present disclosure.

In FIG. 8, it is assumed that a link configuration of transmission and reception UEs for V2X unicast communication has been completed in advance, as described with reference to FIG. 7. Although a measurement procedure is performed separately from V2X communication in FIG. 7, in FIG. 8, measurement is performed by using V2X communication, without a separate measurement procedure.

A V2X transmission UE and a V2X reception UE may receive pieces of information for unicast communication, through system information transmitted through an SIB or UE-specific RRC signaling transmitted to each UE. In this case, the information transmitted by a gNB may include resource pool information for unicast communication, and the resource pool information may be configured differently from a resource pool for groupcast communication and a resource pool for broadcast communication.

For example, the resource pool for unicast communication may be orthogonal along a time-frequency axis to the resource pools for groupcast and broadcast communication. Also, there may be one or more resource pools for unicast communication, and each resource pool may be implicitly or explicitly mapped to a subcarrier spacing that may be used in the resource pool.

When each resource pool is implicitly mapped to the subcarrier spacing, each resource pool may be mapped to the subcarrier spacing in an order in which indexes of resource pools decrease (or increase). That is, a resource pool index 1 may use a subcarrier spacing of 15 kHz, and a resource pool index 2 may use a subcarrier spacing of 30 kHz.

When each resource pool is explicitly mapped to the subcarrier spacing, information on the subcarrier spacing that may be used in each resource pool may be included in resource pool configuration information. In this case, each resource pool may include at least one of a transmission resource pool for V2X transmission and a reception resource pool for V2X reception.

A UE desiring V2X data transmission from among V2X UEs receiving resource pool information through the system information or UE-specific RRC signaling may request the gNB for a resource for V2X data transmission. In this case, a request for a V2X transmission resource may be made via a PUCCH transmitted via a Uu interface.

A UE desiring V2X data reception from among the V2X UEs may request the gNB for a resource for V2X data reception. In this case, a request for a V2X reception resource may be made via a PUCCH transmitted via the Uu interface.

The PUCCH for the request for the V2X transmission resource and the PUCCH for the request for the V2X reception resource may be different from each other. For example, the PUCCH for the request for the V2X transmission resource and the PUCCH for the request for the V2X reception resource may use different time/frequency resources. The UE may identify which PUCCH is a PUCCH for requesting a transmission resource, and which PUCCH is a PUCCH for requesting a reception resource. For example, information on which PUCCH is a PUCCH for requesting a transmission resource and which PUCCH is a PUCCH for requesting a reception resource may be included, through a UE-specific or common configuration for PUCCH transmission.

The UE requesting the resource for V2X transmission may obtain, through DCI, information on at least one of a time resource or a frequency resource for V2X transmission from the gNB. Likewise, the UE requesting the resource for V2X reception may obtain, through the DCI, information on at least one of a time resource or frequency resource for V2X reception from the gNB. A procedure by which the V2X reception UE requests the gNB for the V2X reception resource and a procedure by which the V2X reception UE receives information on the V2X reception resource through the DCI from the gNB may be omitted.

After receiving the DCI, the UE may need to determine whether the DCI is DCI including resource information for V2X transmission or DCI including resource information for V2X reception. To this end, different DCI formats may be used. For example, a DCI format A may be DCI including information related to V2X transmission, and a DCI format B may be DCI including information related to V2X reception. As another example, an indicator indicating whether the DCI is a DCI related to transmission or DCI related to reception may be used in the same DCI format. For example, when '0' is obtained through a 1-bit identifier in DCI, it may indicate DCI for transmission, and '1' is obtained, it may indicate DCI for reception. When a procedure of the V2X reception UE (i.e., a procedure by which the V2X reception UE requests the gNB for a V2X reception resource and a procedure by which the V2X reception UE receives information on the V2X reception resource through DCI from the gNB) is omitted, a field of corresponding DCI may be omitted.

A UE receiving DCI for V2X transmission from the gNB may transmit a reference signal for measurement or sidelink control information and data information in a time/frequency resource indicated by the DCI. As described with reference to FIG. 7, when a sidelink measurement signal is a CSI-RS for measuring sidelink channel quality or a DMRS transmitted via a sidelink data channel, the sidelink measurement signal is always within a bandwidth of the sidelink data channel transmitted by the V2X transmission UE. That is, when there is no sidelink data transmission, the V2X transmission UE does not transmit the sidelink measurement signal. In this case, the bandwidth of the sidelink data channel may refer to a frequency width of the sidelink data channel scheduled by the V2X transmission UE through the DCI from the gNB for sidelink transmission. As another example, the bandwidth of the sidelink data channel may refer to a frequency width of a resource for transmitting a V2X sidelink data channel obtained by the V2X transmission UE through a sensing process in a resource pool configured through the system information or RRC from the gNB for sidelink transmission. In the above example, the sensing process may refer to energy measurement of a sidelink control channel or the sidelink data channel, or may refer to RSRP measurement from a DMRS transmitted via the sidelink control channel or the sidelink data channel. As another example, the sensing process may refer to a decoding process of control information transmitted via the sidelink control channel. As another example, the sensing process may refer to the above two operations (i.e., the energy measurement and the decoding process of control information).

A UE receiving DCI for V2X reception from the gNB may receive a reference signal for measurement or sidelink control information and data information in a time/frequency resource indicated by the DCI. The V2X reception UE may measure channel quality by using a DMRS transmitted via at least one of the sidelink control channel and the sidelink data channel transmitting the sidelink control information and data information. As another example, the V2X reception UE may measure channel quality by receiving the reference signal for measurement. In this case, the channel quality may include at least one of reference received power (RSRP), channel quality information (CQI), a rank indicator (RI), a precoder matrix indicator (PMI), a CSI-RS resource index (CRI), and a layer indicator (LI).

In more detail, the V2X reception UE may receive and decode the sidelink control information from the V2X transmission UE. The V2X reception UE may obtain time and/or frequency resource information of the sidelink data channel from the decoded control information. The V2X reception UE may indirectly derive information on a bandwidth in which a sidelink measurement signal is transmitted, through the obtained information. In this case, the V2X transmission UE may not transmit additional information on the bandwidth of the sidelink measurement signal to the V2X reception UE. As another example, the information on the bandwidth in which the sidelink measurement signal is transmitted may be transmitted by the V2X transmission UE through the sidelink control information to the V2X reception UE. Accordingly, in the above example, the V2X reception UE may decode the sidelink control information and may obtain the information on the bandwidth of the sidelink measurement signal.

The V2X reception UE may report channel quality measured by the V2X reception UE to the V2X transmission UE or the gNB. In this case, whether the channel quality is to be reported to the V2X transmission UE or the gNB may be indicated by the gNB through DCI for V2X reception (a sidelink grant for RX in FIG. 8). As another example, whether the channel quality is to be reported to the V2X transmission UE or the gNB may be configured by the gNB in the V2X UEs, through UE-specific RRC or common RRC signaling.

A resource for a measurement report may be explicitly included in grant information for the V2X transmission UE (sidelink grant for RX), or may be explicitly included in the sidelink control information transmitted by the V2X transmission UE to the V2X reception UE. As another example, as described with reference to FIG. 7, the V2X reception UE may determine the resource for the measurement report, through an association relationship with a time resource and a frequency resource in which control information or data information for sidelink transmission is transmitted by the V2X transmission UE.

When the V2X transmission UE receives a channel quality measurement report, the V2X transmission UE may transfer the information to the gNB. In this case, the channel quality measurement report may be transmitted through a MAC CE transmitted via a PUCCH or a PUSCH. The V2X transmission UE or the gNB receiving the channel quality measurement report may adjust the number of repeated transmissions or an aggregation level of a next V2X control channel, the number of repeated transmissions or a modulation order of a V2X data channel, and a channel coding rate, based on the channel quality measurement report.

When a procedure of the V2X reception UE (i.e., a procedure by which the V2X reception UE requests the gNB for a V2X reception resource and a procedure by which the V2X reception UE receives information on the V2X reception resource through DCI from the gNB) is omitted, a field of corresponding DCI may be omitted.

Because unicast communication has been mainly described in FIG. 8, it has been assumed that there are one V2X transmission UE V2X-TX1 and one V2X reception UE V2X-RX1. However, procedures described with reference to FIG. 8 may be applied to groupcast communication in which there are two or more reception UEs. For example, when it is assumed that there is another V2X reception UE V2X-RX2, the V2X reception UE V2X-RX2 may transmit a request for sidelink reception to the gNB. The gNB may transmit control information for sidelink reception to the V2X reception UE V2X-RX2 (a sidelink grant for RX). The V2X reception UE V2X-RX2 receiving sidelink control information and data from the V2X transmission UE V2X-TX1 may perform sidelink measurement like the V2X reception UE V2X-RX1, and may transmit a measurement result to the V2X transmission UE V2X-TX1 or the gNB. When the V2X transmission UE V2X-TX1 receives measurement results from two or more reception UEs (i.e., the V2X reception UEs V2X-RX1 and V2X-RX2), the V2X transmission UE V2X-TX1 may report the measurement result of each of the V2X reception UEs V2X-RX1 and V2X-RX2 to the gNB, or may multiplex the measurement results and may transmit the measurement results via one channel.

It has been assumed in FIG. 8 that the V2X transmission UE and the reception UE exist within coverage of the gNB, like in FIG. 7. A resource allocation method in which the V2X transmission UE operates in an RRC connected state with the gNB (the V2X transmission UE is scheduled with a transmission resource of sidelink control information and data information from the gNB) has been assumed. However, this is merely an example, and the present disclosure is not limited thereto. The V2X transmission UE and the reception UE may operate in various situations.

For example, the V2X transmission UE may exist within the coverage of the gNB, and the V2X reception UE may exist outside the coverage. As another example, the V2X transmission UE may exist within coverage of a gNB-1, and the V2X reception UE may exist within coverage of a gNB-2. In this case, the procedure of FIG. 8 may be re-used.

Both the V2X transmission UE and the V2X reception UE may exist outside the coverage of the gNB. In this case, the V2X transmission and reception UEs may not perform an RRC connection configuration with the gNB. Accordingly, in this case, in FIG. 7, an operation by which the V2X transmission and reception UEs receive configuration information for transmission of a sidelink measurement signal from the gNB may be omitted. Also, a procedure by which the V2X transmission and reception UEs request the gNB to transmit a sidelink measurement signal, a procedure by which the V2X transmission and reception UEs receive an indication for transmission of the sidelink measurement signal from the gNB, and a procedure by which the V2X transmission UE transmits a sidelink channel quality report result received from the V2X reception UE to the gNB may be omitted.

As described above, the V2X transmission UE may directly select a transmission resource through a sensing process in a pre-configured resource pool. The sidelink measurement signal may be transmitted along with data information in the transmission resource in which sidelink data signal is transmitted. That is, the V2X transmission UE may determine whether there is sidelink control information and/or data information to be transmitted, and, when there is the information, may transmit the sidelink measurement signal. Otherwise, the V2X transmission UE may not transmit the sidelink measurement signal, or when there is a sidelink measurement signal that is being transmitted, the V2X transmission UE may stop transmitting the sidelink measurement signal.

As another example, the V2X transmission UE may exist within the coverage of the gNB, but may operate in a state where there is no RRC connection configuration with the gNB. In this case, as described above, the V2X transmission UE may directly select a transmission resource through a sensing process in a resource pool configured by the gNB. In this case, a procedure by which the V2X transmission UE requests the gNB to transmit a sidelink measurement signal, a procedure by which the V2X transmission UE receives an indication for transmission of the sidelink measurement signal from the gNB, and a procedure by which the V2X transmission UE transmits a sidelink channel quality report received from the V2X reception UE to the gNB may be omitted.

Figure 9:
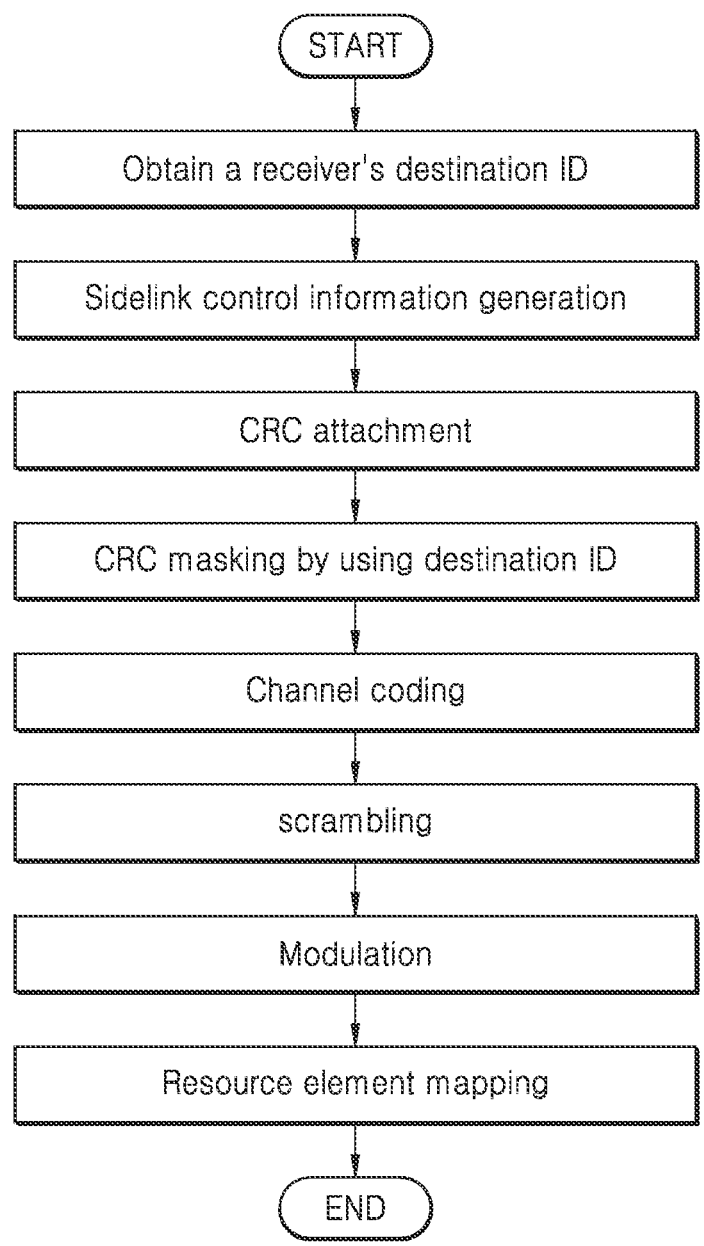
FIG. 9 is a diagram illustrating a signal processing procedure of a transmission terminal for V2X communication, according to an embodiment of the present disclosure.

FIG. 9 is a diagram illustrating a signal processing procedure of a transmission terminal for V2X communication, according to an embodiment of the present disclosure.

A V2X transmission terminal may obtain ID (destination ID) information of a V2X reception terminal including K bits from a higher layer. In this case, in V2X unicast communication, the ID information may be an ID indicating a reception terminal. In V2X groupcast communication, the ID information may be an ID indicating a reception group.

The V2X transmission terminal may generate sidelink control information, and may add a cyclic redundancy check (CRC) to the generated sidelink control information. That is, when it is assumed that the sidelink control information includes A bits and the CRC includes L bits, the sidelink control information to which the CRC is added may include A+L bits.

In this case, some or all of the K bits of the ID may be masked by the CRC including the L bits constituting the sidelink control information. In more detail, when a size of the ID is K bits and K>L, most significant bit (MSB) L bits or least significant bit (LSB) L bits from among the K bits may be used for CRC masking. In this case, the CRC masking may refer to performing a bitwise exclusive OR (XOR) operation on MSB L bits (or LSB L bits) from among the L bits constituting the CRC and the K bits constituting the ID. The remaining (K-L) bits that are not used for the CRC masking from among the K bits constituting the ID may be transmitted in a field of the sidelink control information (SCI) or may be transmitted through a header of a MAC PDU transmitted via a sidelink data channel.

There may be other combinations as follows. L bits from among the K bits constituting the ID may be used for the CRC masking, N bits (K-L>N) from among the remaining (K-L) bits may be transmitted in the field of the sidelink control information, and the remaining (K-L-N) bits may be transmitted through the header of the MAC PDU.

As another example, when a size of the ID is K bits, the number of bits of the CRC is L, and K=L, all of the K bits constituting the ID may be used for CRC masking. As another example, when K<L, the K bits constituting the ID may be used for the CRC masking by performing an XOR operation on MSB K bits or LSB K bits of the L bits constituting the CRC.

The V2X transmission terminal may perform channel coding on the sidelink control information to which the CRC masked with the destination ID is added.

The channel coded sidelink control information may be scrambled by using a sequence generated by using at least one of a cell ID, a transmission terminal ID (source ID), and a reception terminal ID (destination ID) as an initial value. In this case, scrambling may be performed by a modulo 2 operation on a sum of bits constituting the sidelink control information and bits constituting a scrambling sequence. For example, when it is assumed that bits constituting the sidelink control information are (0), b(1), . . . , and b(M−1) and bits constituting the scrambling sequence are c(i) (in this case, i ranges from 0 to a sequence length −1), scrambling may be performed by a modulo 2 operation on a result of b(i)+c(i).

When the V2X transmission terminal masks the CRC through the destination ID, a scrambling operation of FIG. 9 is similar to a CRC masking operation and thus may be omitted.

The channel coded sidelink control information (when scrambling is not performed) or scrambled sidelink control information may be generated as a symbol through a modulation process, and may be mapped to a resource (a resource element) of a sidelink control channel.

Figure 10:
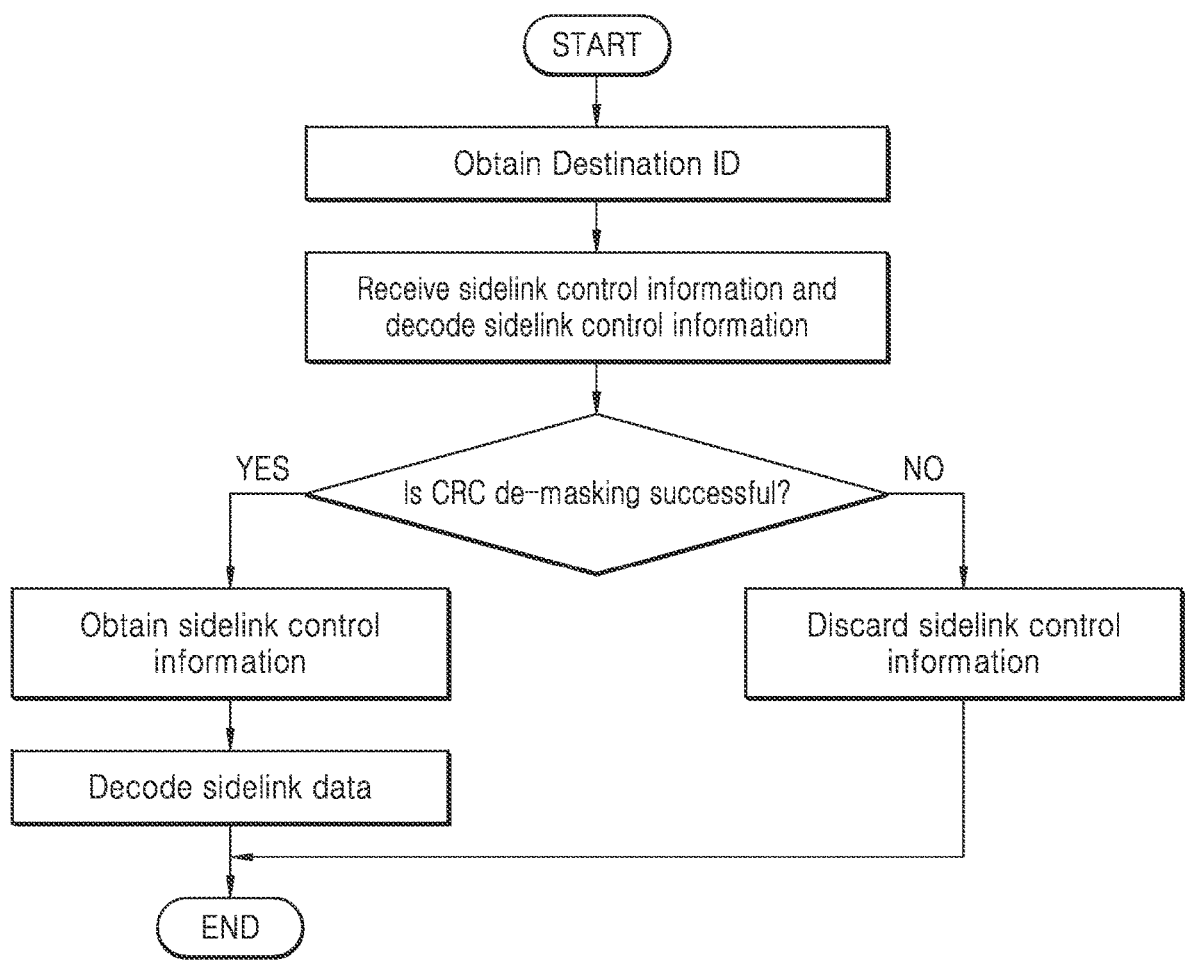
FIG. 10 is a diagram illustrating an operation of a V2X reception terminal, according to an embodiment of the present disclosure.

FIG. 10 is a diagram illustrating an operation of a V2X reception terminal, according to an embodiment of the present disclosure.

A V2X reception terminal may obtain a destination ID that may be used by the V2X reception terminal from a higher layer. In this case, the destination ID may be one of an ID for unicast communication, an ID for groupcast communication, and an ID for broadcast communication. Although a point of time when the destination ID is obtained from the higher layer is a first start point in FIG. 10, this is merely an example, and the present disclosure is not limited thereto. That is, a point of time when the ID is obtained from the higher layer may be an arbitrary point of time before the V2X reception terminal performs CRC de-masking in FIG. 10.

The V2X reception terminal receiving sidelink control information from a V2X transmission terminal may decode the sidelink control information, and may perform CRC de-masking by performing an XOR operation on the ID obtained by the V2X reception terminal from the higher layer and a CRC constituting the sidelink control information.

The V2X reception terminal may perform a CRC operation by using the de-masked CRC, and when the CRC operation is successful, the V2X reception terminal may obtain a location of a time/frequency resource of sidelink data information from the sidelink control information and may decode the sidelink data information.

When the CRC operation is not successful, the V2X reception terminal may delete the sidelink control information from a buffer without storing the sidelink control information.

Figure 11:
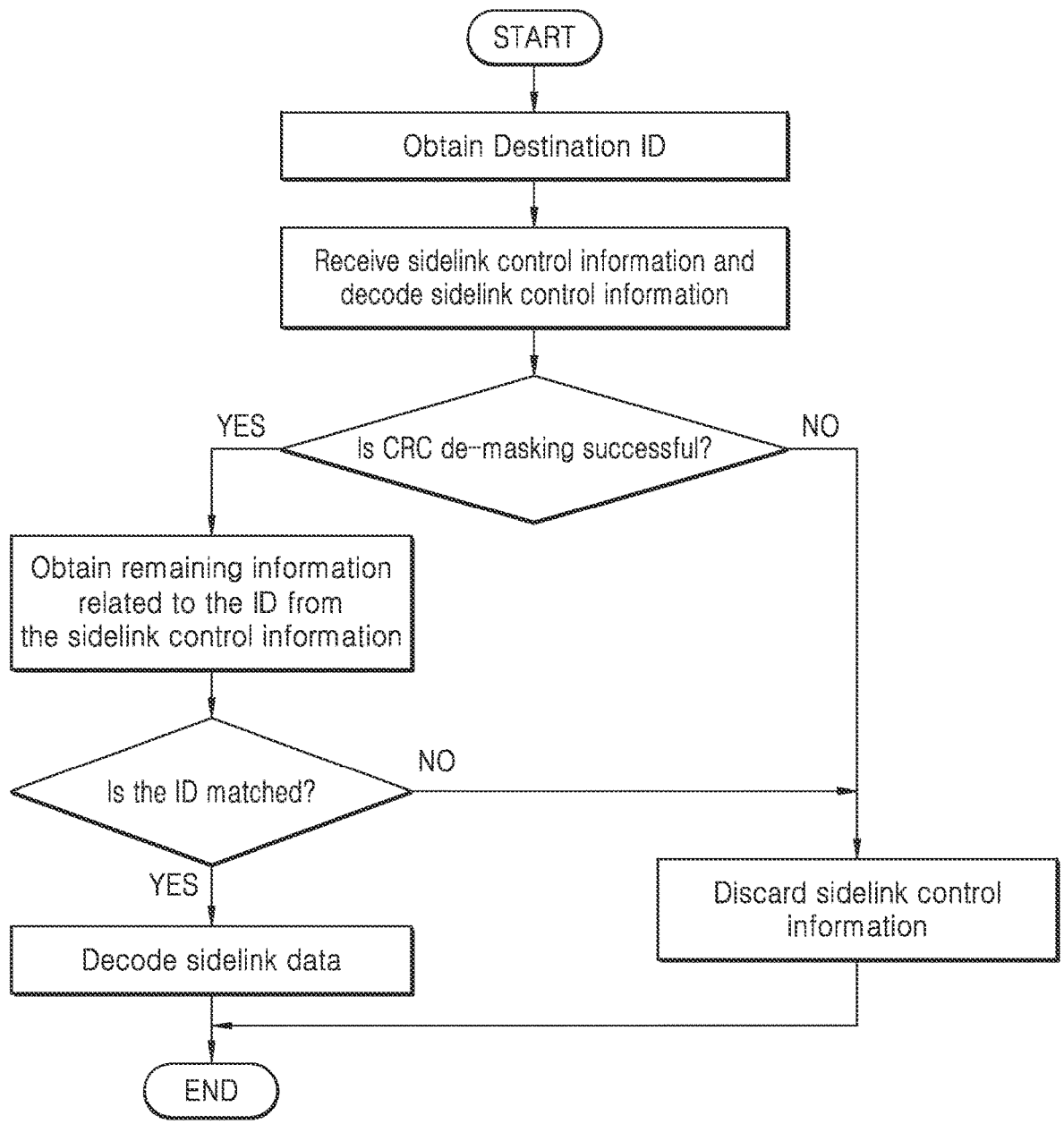
FIG. 11 is a diagram illustrating an operation of a V2X reception terminal, according to another embodiment of the present disclosure.

FIG. 11 is a diagram illustrating an operation of a V2X reception terminal, according to another embodiment of the present disclosure.

Although a destination ID of a reception terminal is masked by a CRC and transmitted in FIG. 10, in FIG. 11, part of information on a destination ID of a reception terminal is masked by a CRC and transmitted and the remaining part of the information on the destination ID is transmitted through a bit field of sidelink control information. As in FIG. 10, in FIG. 11, a point of time when a destination ID is obtained from a higher layer may be an arbitrary point of time before the terminal performs CRC de-masking.

The V2X reception terminal receiving sidelink control information from a transmission terminal may decode the sidelink control information, and may perform CRC de-masking by performing an XOR operation on a CRC constituting the sidelink control information and an ID obtained by the V2X reception terminal from a higher layer.

The V2X reception terminal may perform a CRC operation by using the de-masked CRC, and when the CRC operation is not successful, the V2X reception terminal may delete the sidelink control information from a buffer without storing the sidelink control information.

When the CRC operation is successful, the V2X reception terminal may obtain the remaining information of a destination ID from a bit field of the sidelink control information, and may check whether an ID of the bit field is matched to the ID obtained by the V2X reception terminal from the higher layer.

When the IDs are matched, the V2X reception terminal may obtain a location of a time/frequency resource of sidelink data information indicated by the sidelink control information, and may decode the sidelink data information.

Although not shown in FIG. 11, the V2X reception terminal may constitute the destination ID by using some information of the destination ID used for the CRC de-masking and the remaining information of the destination ID transmitted through the bit field of the sidelink control information, and may determine whether the destination ID is matched to the destination ID obtained by the V2X reception terminal from the higher layer.

For example, it may be assumed that the destination ID includes K bits and L bits are used for CRC masking. In this case, the V2X reception terminal may perform CRC de-masking by using MSB L bits or LSB L bits of the destination ID including the K bits. When a CRC operation is successful, the V2X reception terminal may obtain information of the remaining K-L bits constituting the destination ID through the bit field of the sidelink control information.

Accordingly, the V2X reception terminal may constitute the destination of ID including the K bits by using information of the L bits used for the CRC de-masking and information of the remaining K-L bits transmitted through the bit field of the sidelink control information, and may determine whether the destination ID is matched to the destination ID received from the higher layer through comparison.

Figure 12:
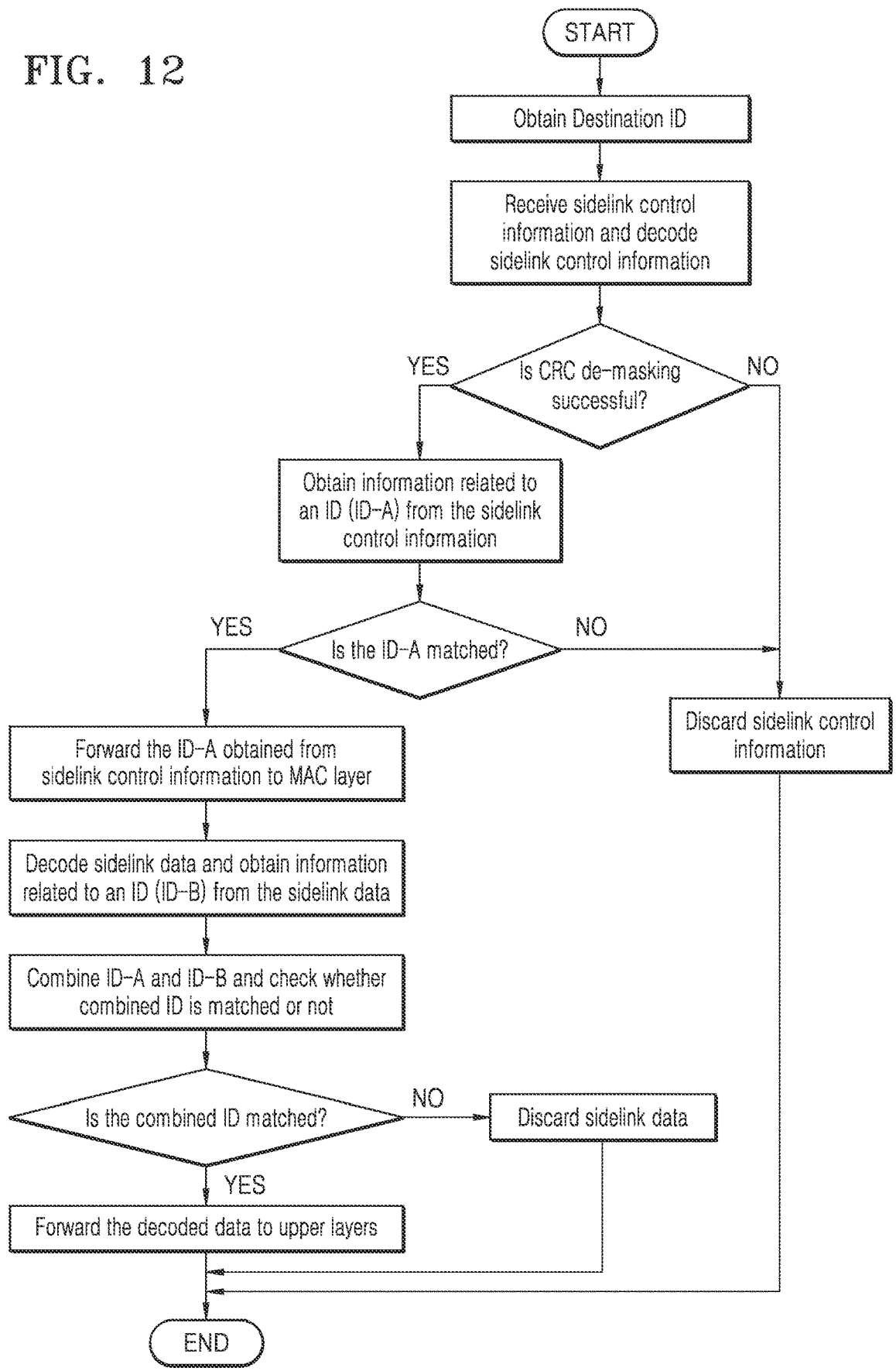
FIG. 12 is a diagram illustrating an operation of a V2X reception terminal, according to another embodiment of the present disclosure.

FIG. 12 is a diagram illustrating an operation of a V2X reception terminal, according to another embodiment of the present disclosure.

In FIG. 10, a destination ID of a V2X reception terminal is masked by a CRC and transmitted, and in FIG. 11, part of information on a destination ID of a V2X reception terminal is masked by a CRC and transmitted and the remaining part of the information on the destination ID is transmitted through a bit field of sidelink control information. However, in FIG. 12, information on a destination ID of a V2X reception terminal is transmitted through a bit field of sidelink control information and a CRC and through a header of a MAC PDU transmitted via a sidelink data channel.

As in FIGS. 10 and 11, in FIG. 12, a point of time when a V2X reception terminal obtains a destination ID from a higher layer may be an arbitrary point of time before the V2X reception terminal performs CRC de-masking. The V2X reception terminal receiving sidelink control information from a V2X transmission terminal may decode the sidelink control information, and may perform CRC de-masking by performing an XOR operation on an ID obtained by the V2X reception terminal from a higher layer and a CRC constituting the sidelink control information.

The V2X reception terminal may perform a CRC operation by using the de-masked CRC, and when the CRC operation is not successful, the V2X reception terminal may delete the sidelink control information from a buffer without storing the sidelink control information. When the CRC operation is successful, the V2X reception terminal may obtain the remaining information (i.e., ID-A in FIG. 12) of the destination ID from a bit field of the sidelink control information, and may check whether the ID of the bit field is matched to the ID obtained by the V2X reception terminal from the higher layer.

When the IDs are not matched to each other, the V2X reception terminal may delete the sidelink control information from the buffer without storing the sidelink control information. When the IDs are matched to each other, the V2X reception terminal may obtain a location of a time/frequency resource of sidelink data information indicated by the sidelink control information, and may decode the sidelink data information.

The V2X reception terminal decoding the sidelink data information may obtain the remaining information (ID-B) of the destination ID, through a header of a MAC PDU included in the sidelink data information.

The V2X reception terminal may constitute the destination ID by using some information of the destination ID used for the CRC de-masking and some information (ID-A) of the destination ID transmitted through the bit field of the sidelink control information, and some information (ID-B) of the destination ID transmitted through the header of the MAC PDU of the sidelink data information, and may determine whether the destination ID is matched to the destination ID obtained by the V2X reception terminal from the higher layer.

For example, it may be assumed that the destination ID includes K bits and L bits are used for CRC masking. Also, it is assumed that destination ID information of N bits is transmitted through the bit field of the sidelink control information, and destination ID information of the remaining K-L-N bits is transmitted through the header of the MAC PDU constituting the sidelink data information. In this case, the V2X reception terminal may perform CRC de-masking by using MSB L bits or LSB L bits of the destination ID including the K bits.

When a CRC operation is successful, information of N bits constituting the destination ID may be obtained through the bit field of the sidelink control information (ID-A).

The V2X reception terminal may obtain information of K-L-N bits constituting the destination ID through the header of the MAC PDU constituting the sidelink data information (ID-B).

Accordingly, the V2X reception terminal may constitute the destination ID of the K bits by using the information of the L bits used for the CRC de-masking and the ID information (ID-A) of the remaining N bits transmitted through the bit field of the sidelink control information and the destination ID (ID-B) including the K-L-N bits of the header of the MAC PDU constituting the sidelink data information, and may determine whether the destination ID is matched to the destination ID received by the V2X reception terminal from the higher layer through comparison.

When the destination IDs are matched to each other, the V2X reception terminal may transfer the decoded sidelink data information to the higher layer. When the destination IDs are not matched to each other, the V2X reception terminal may delete the decoded sidelink data information from the buffer.

Figure 13:
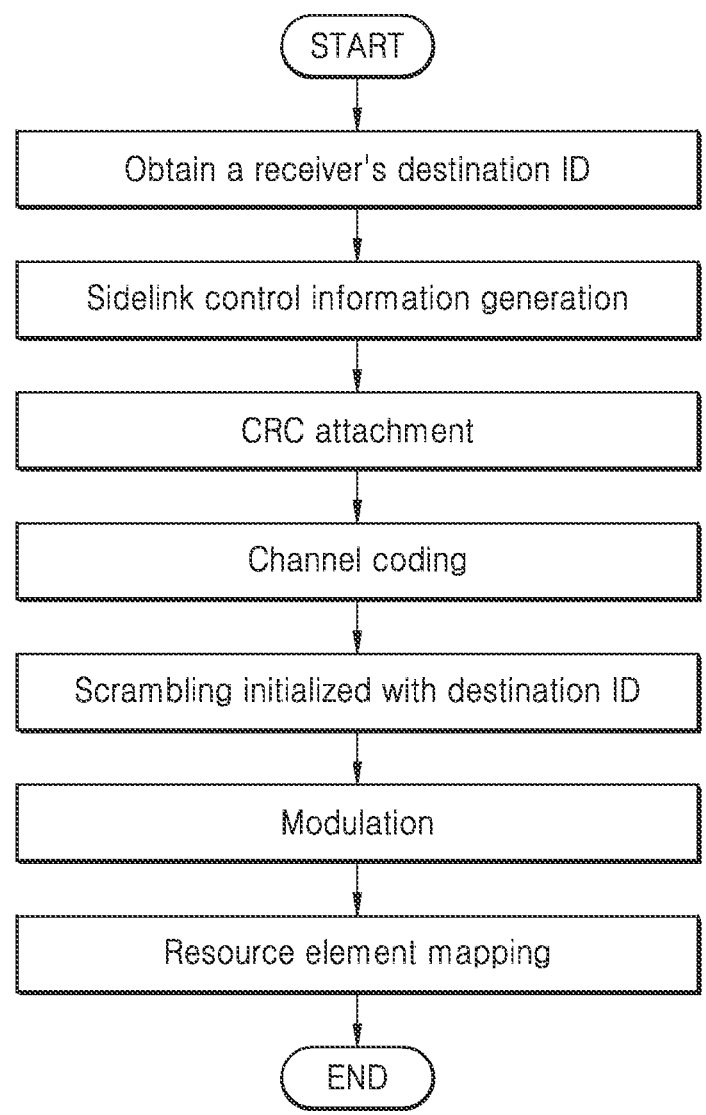
FIG. 13 is a diagram illustrating a method by which a V2X transmission terminal transmits a destination ID, according to another embodiment of the present disclosure.

FIG. 13 is a diagram illustrating a method by which a V2X transmission terminal transmits a destination ID, according to another embodiment of the present disclosure.

Unlike in FIGS. 9 through 12, in FIG. 13, K bits constituting a destination ID are not masked by a CRC, and may be used for scrambling of a sidelink control channel in which sidelink control information is transmitted.

A V2X transmission terminal may obtain ID (destination ID) information of a V2X reception terminal including K bits from a higher layer. In this case, in V2X unicast communication, the ID information may be an ID indicating a reception terminal. In V2X groupcast communication, the ID information may be an ID indicating a reception group.

The V2X transmission terminal may generate sidelink control information, and may add a cyclic redundancy check (CRC) to the generated sidelink control information. That is, when it is assumed that the sidelink control information includes A bits and the CRC includes L bits, the sidelink control information to which the CRC is added may include A+L bits.

The V2X transmission terminal may perform channel coding on the sidelink control information to which the CRC is added.

The channel coded sidelink control information may be scrambled by using a sequence generated by using at least one of a cell ID, a transmission terminal ID (source ID), and a reception terminal ID (destination ID) as an initial value. In this case, scrambling may be performed by a modulo 2 operation on a sum of bits constituting the sidelink control information and bits constituting a scrambling sequence. When it is assumed that bits constituting the sidelink control information are $b(0)$, $b(1)$, . . . , and $b(M-1)$ and bits constituting the scrambling sequence are $c(i)$ (in this case, i ranges from 0 to a sequence length $-1$), scrambling may be performed by a modulo 2 operation on a result of $b(i)+c(i)$. The scrambled sidelink control information may be generated as a symbol through a modulation process, and may be mapped to a resource (a resource element) of a sidelink control channel.

Figure 14:
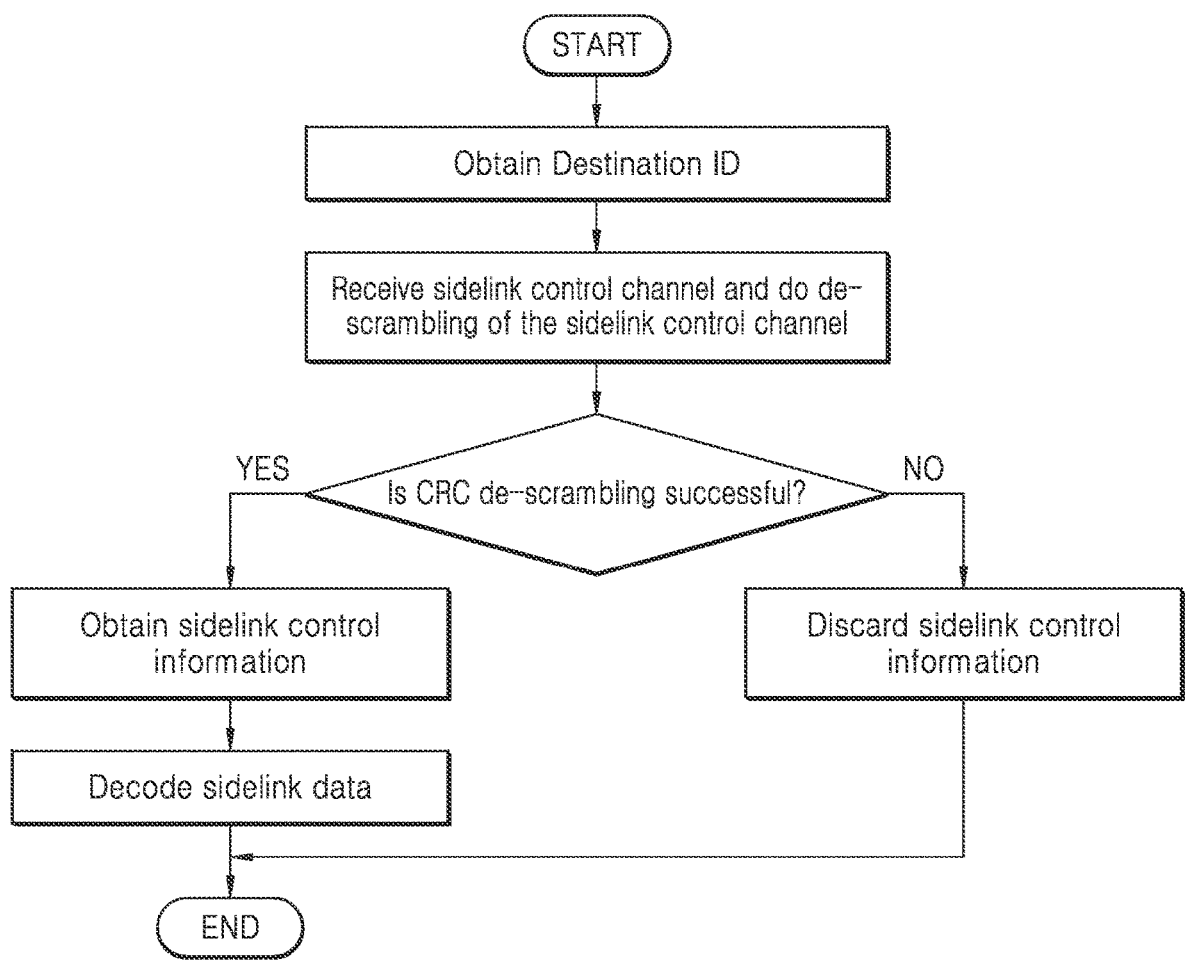
FIG. 14 is a diagram illustrating an operation of a V2X reception terminal, according to another embodiment of the present disclosure.

FIG. 14 is a diagram illustrating an operation of a V2X reception terminal, according to another embodiment of the present disclosure.

A V2X reception terminal may obtain a destination ID that may be used by the V2X reception terminal from a higher layer. In this case, the destination ID may be one of an ID for unicast communication, an ID for groupcast communication, and an ID for broadcast communication. In this case, although a point of time when the destination ID is obtained from the higher layer is a first start point in FIG. 14, the present disclosure is not limited thereto. That is, a point of time when the ID is obtained from the higher layer may be an arbitrary point of time before the V2X reception terminal performs de-scrambling of a sidelink control channel in FIG. 14.

The V2X reception terminal receiving the sidelink control channel from a V2X transmission terminal may use the destination ID obtained from the higher layer to de-scramble the sidelink control channel.

The V2X reception terminal may perform de-scrambling, may decode sidelink control information, and then may perform a CRC operation. When the de-scrambled sidelink control channel passes the CRC operation, it may be determined that the de-scrambling succeeds. The V2X reception terminal may obtain the sidelink control information transmitted via the sidelink control channel.

The V2X reception terminal may obtain a location of a time/frequency resource of sidelink data information from the sidelink control information, and may decode the sidelink data information.

When the sidelink control information is decoded and then the CRC operation is not successful, it may be determined that the de-scrambling fails. When the de-scrambling fails, the V2X reception terminal may delete the sidelink control information from a buffer without storing the sidelink control information. When the buffer stores the sidelink data information, the V2X reception terminal may delete both the sidelink control information and the sidelink data information from the buffer.

Some information of the destination ID may be used as an initial value for generating a scrambling sequence of the sidelink control channel, and the remaining information of the destination ID may be transmitted through a bit field of control information transmitted via the sidelink control channel. In this case, an operation of the V2X reception terminal may be similar to that of FIG. 11.

Also, some information of the destination ID may be used as an initial value for generating the scrambling sequence of the sidelink control channel, some information of the destination ID may be transmitted through the bit field of the control information transmitted via the sidelink control channel, and the remaining information of the destination ID may be transmitted through a MAC PDU header transmitted via a sidelink data channel. In this case, an operation of the V2X reception terminal may be similar to that of FIG. 12.

Figure 15:
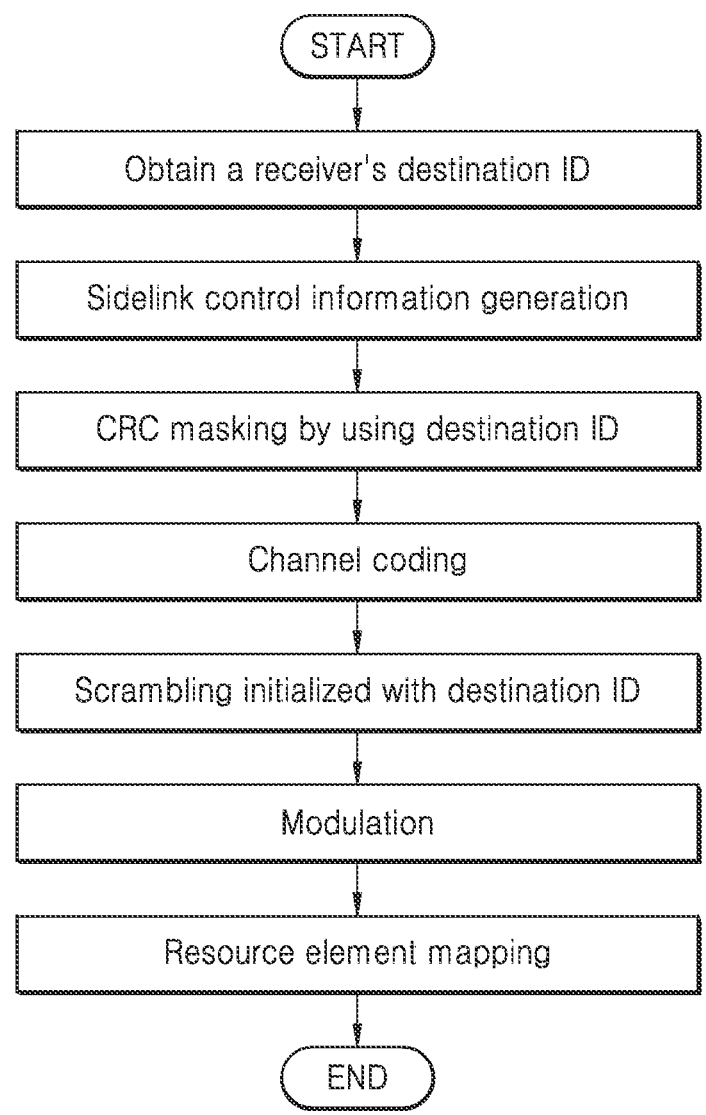
FIG. 15 is a diagram illustrating a method by which a V2X transmission terminal transmits a destination ID, according to another embodiment of the present disclosure.

FIG. 15 is a diagram illustrating a method by which a V2X transmission terminal transmits a destination ID, according to another embodiment of the present disclosure.

In FIG. 9, a destination ID is masked by a CRC of sidelink control information and transmitted, and in FIG. 13, a destination ID is used to initialize a scrambling sequence used for scrambling of a sidelink control channel. However, in FIG. 15, both methods of FIGS. 9 and 13 are used.

A V2X transmission terminal may obtain ID (destination ID) information of a V2X reception terminal including K bits from a higher layer. In this case, in V2X unicast communication, the ID information may be an ID indicating a reception terminal. In V2X groupcast communication, the ID information may be an ID indicating a reception group.

The V2X transmission terminal may generate sidelink control information.

The V2X transmission terminal may add a cyclic redundancy check (CRC) to the generated sidelink control information. That is, when it is assumed that the sidelink control information includes A bits and the CRC includes L bits, the sidelink control information to which the CRC is added may include A+L bits. In this case, some or all of the K bits of the ID may be masked by the CRC including the L bits constituting the sidelink control information.

In more detail, when a size of the ID is K bits and K>L, MSB L bits or LSB L bits from among the K bits may be used for CRC masking. In this case, the CRC masking may refer to performing a bitwise exclusive OR (XOR) operation on MSB L bits (or LSB L bits) from among the L bits constituting the CRC and the K bits constituting the ID. The remaining (K-L) bits that are not used for the CRC masking from among the K bits constituting the ID may be transmitted in a field of the sidelink control information (SCI) or may be transmitted through a header of a MAC PDU transmitted via a sidelink data channel.

There may be other combinations as follows. L bits from among the K bits constituting the ID may be used for the CRC masking, N bits (K-L>N) from among the remaining (K-L) bits may be transmitted in the field of the sidelink control information, and the remaining (K-L-N) bits may be transmitted through the header of the MAC PDU.

As another example, when a size of the ID is K bits, the number of bits of the CRC is L, and K=L, all of the K bits constituting the ID may be used for CRC masking.

As another example, when K<L, the K bits constituting the ID may be used for the CRC masking by performing an XOR operation on MSB K bits or LSB K bits of the L bits constituting the CRC.

The V2X transmission terminal may perform channel coding on the sidelink control information to which the CRC masked with the destination ID is added.

The channel coded sidelink control information may be scrambled by using a sequence generated by using at least one of a cell ID, a transmission terminal ID (source ID), and a reception terminal ID (destination ID) as an initial value. In this case, scrambling may be performed by a modulo 2 operation on a sum of bits constituting the sidelink control information and bits constituting a scrambling sequence. For example, when it is assumed that bits constituting the sidelink control information are $b(0), b(1), \ldots,$ and $b(M-1)$ and bits constituting the scrambling sequence are $c(i)$ (in this case, i ranges from 0 to a sequence length −1), scrambling may be performed by a modulo 2 operation on a result of $b(i)+c(i)$.

The scrambled sidelink control information may be generated as a symbol through a modulation process, and may be mapped to a resource (a resource element) of a sidelink control channel.

Figure 16:
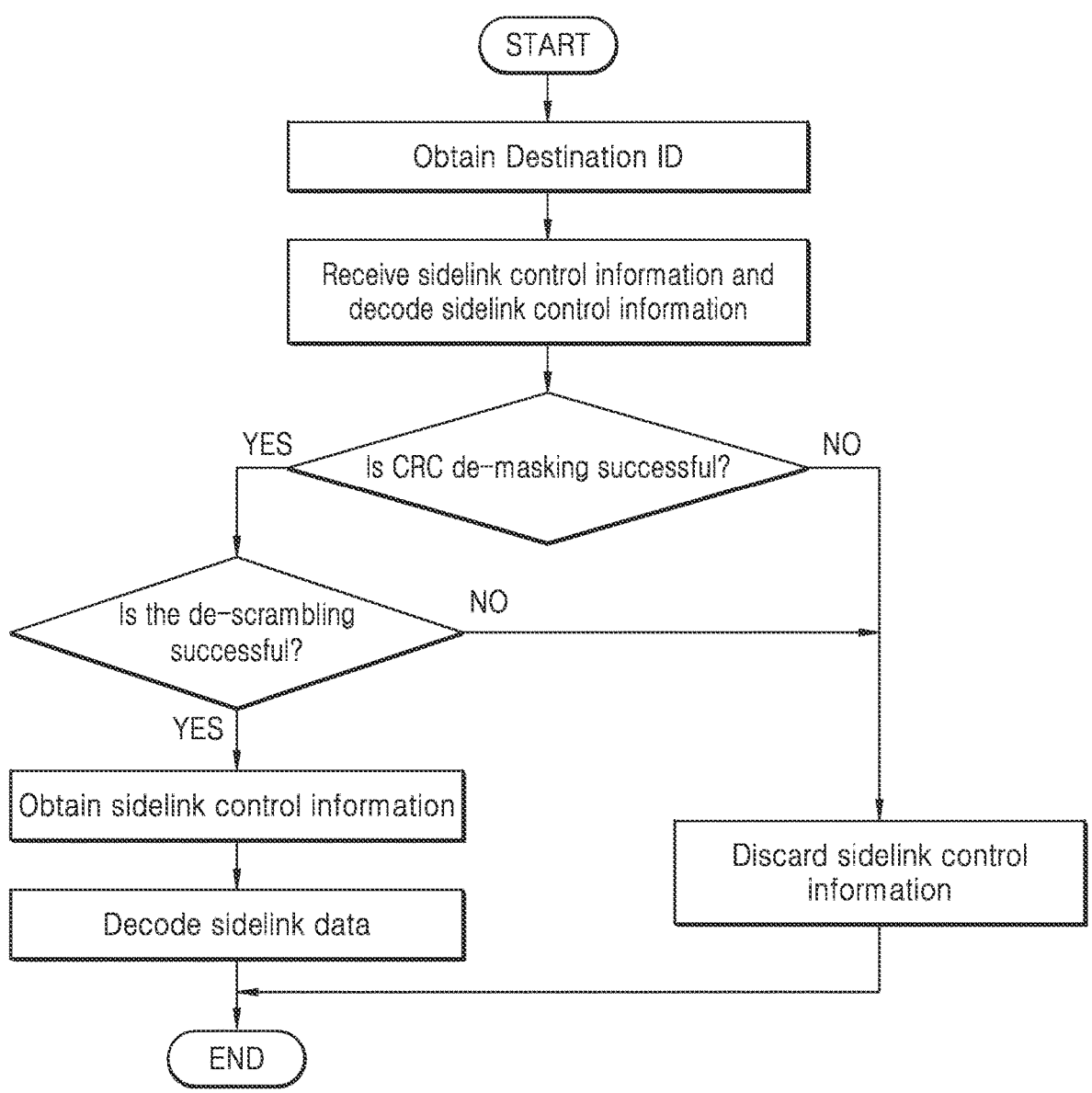
FIG. 16 is a diagram illustrating an operation of a V2X reception terminal, according to another embodiment of the present disclosure.

FIG. 16 is a diagram illustrating an operation of a V2X reception terminal, according to another embodiment of the present disclosure.

In detail, FIG. 16 is a diagram illustrating an operation of a V2X reception terminal when a V2X transmission terminal operates according to FIG. 15.

A V2X reception terminal may obtain a destination ID that may be used by the V2X reception terminal from a higher layer. In this case, the destination ID may be one of an ID for unicast communication, an ID for groupcast communication, and an ID for broadcast communication. Although a point of time when the destination ID is obtained from the higher layer is a first start point, the present disclosure is not limited thereto. That is, a point of time when the ID is obtained from the higher layer may be an arbitrary point of time before the terminal performs CRC de-masking in FIG. 16.

The V2X reception terminal receiving sidelink control information from a V2X transmission terminal may decode the sidelink control information, and may perform CRC de-masking by performing an XOR operation on the ID obtained by the V2X reception terminal from the higher layer and a CRC constituting the sidelink control information.

The V2X reception terminal may perform a CRC operation by using the de-masked CRC, and when the CRC operation is successful, the V2X reception terminal may perform de-scrambling. In this case, a sequence used for the de-scrambling may be generated by using the destination ID received by the V2X reception terminal from the higher layer as described with reference to FIG. 15.

When the de-scrambling succeeds, the V2X reception terminal may obtain the sidelink control information transmitted via a sidelink control channel. The V2X reception terminal may obtain a location of a time/frequency resource of sidelink data information from the sidelink control information and may decode the sidelink data information.

When the CRC operation is not successful, the V2X reception terminal may delete the sidelink control information from a buffer without storing the sidelink control information. When the V2X reception terminal stores the sidelink data information, the V2X reception terminal may delete both the sidelink control information and the sidelink data information from the buffer.

As described with reference to FIGS. 11 and 12, some information of the destination ID may be transmitted through a bit field of control information transmitted via the sidelink control channel. In this case, an operation of the V2X reception terminal after the de-scrambling succeeds may be similar to an operation after CRC de-masking succeeds in FIG. 11. Also, some information of the destination ID may be transmitted through the bit field of the control information transmitted via the sidelink control channel, and the remaining information of the destination ID may be transmitted through a MAC PDU header transmitted via a sidelink data channel. In this case, an operation of the V2X reception terminal after the de-scrambling succeeds may be similar to an operation after CRC de-masking succeeds in FIG. 12.

FIG. 17 is a diagram illustrating a method of notifying a pair of a V2X transmission terminal and a V2X reception terminal, according to an embodiment of the present disclosure.

In particular, FIG. 17 is a diagram illustrating a case where a base station should simultaneously transmit an indication for measurement to a V2X transmission terminal and a V2X reception terminal (a measurement indication of FIG. 7) or the base station should simultaneously transmit an indication for sidelink transmission and reception to the V2X transmission terminal and the V2X reception (a sidelink grant for TX and a sidelink grant for RX of FIG. 8), according to an embodiment.

For example, in V2X unicast communication, one V2X transmission terminal and one V2X reception terminal may be paired to perform communication. In this case, many pairs of transmission and reception terminals for unicast communication may exist in a cell controlled by one base station. In this case, because the base station transmits a measurement indication or a sidelink grant to each terminal through UE-specific DCI, overhead of control information for sidelink communication may increase. Also, as described with reference to FIGS. 7 and 8, because the base station may transmit a measurement indication or a sidelink grant to each of a V2X transmission terminal and a V2X reception terminal that are paired, overhead may further increase. Such overhead problems may occur not only in unicast communication but also in groupcast communication.

Unlike in unicast communication, in V2X groupcast communication, there may be one transmission terminal and two or more reception terminals. In groupcast communication, when the base station independently transmits a measurement indication or a sidelink grant to each terminal, unnecessary overhead may increase. For example, the base station may independently transmit information on a terminal that is to transmit a measurement signal through a measurement indication and a terminal that receives the measurement signal and parameters related to transmission and reception of the measurement signal to each terminal through UE-specific DCI. It is assumed that one transmission terminal and 10 reception terminals exist in groupcast communication. In this case, because the base station should transmit, to each of the 10 reception terminals, the same information (an indicator indicating reception of the measurement signal, and parameters for receiving the measurement signal, for example, a time when the measurement signal is transmitted, a frequency resource, or a sequence index), signaling overhead may unnecessarily increase.

In order to solve the problem, a method of transmitting the same information to be transmitted to two or more terminals through group common DCI, instead of UE-specific DCI, is illustrated in FIG. 17. In more detail, K terminal pairs may exist in a cell, and each terminal pair may perform unicast or groupcast communication.

For example, when all of the K terminal pairs perform unicast communication, each terminal pair may include one V2X transmission terminal and one V2X reception terminal. In this case, as shown in (a) of FIG. 17, the base station may transmit a command for transmission of a measurement signal (or a sidelink grant for TX) or reception of the measurement signal (or a sidelink grant for RX) through 2 bits to each terminal pair.

In more detail, it may be assumed that K=4 (which means that four terminal pairs exist) and all of the terminal pairs perform unicast communication. In this case, the base station may transmit group common DCI including 4 (four terminal pairs)×2 (unicast communication)=8 bits to the four terminal pairs.

Each terminal pair may receive the group common DCI, by detecting a radio network temporary identifier (RNTI) (e.g., a V2X group common RNTI) different from an RNTI (e.g., a cell (C)-RNTI) used in cellular communication or an RNTI (e.g., a V2X C-RNTI) UE-specifically transmitted to each terminal for sidelink communication.

In this case, the base station may notify, to each terminal pair, which part of the group common DCI should be used by the terminal pair through RRC signaling. For example, the base station may notify a start point by notifying that, from among the four terminal pairs, a first terminal pair should use the information from a first bit, a second terminal pair should use the information from a third bit, and a third terminal pair should use the information from a fifth bit.

Information on which bits from a start point should be used by each terminal pair is correlated with the number of terminals constituting each terminal pair. For example, in unicast information, because the number of terminals constituting each terminal pair is 2, 2 bits may be used from a start point (start bit) notified by the base station through RRC signaling. Also, each terminal pair needs to know which bit from among the 2 bits (a0 and a1 in FIG. 17) should be used by the terminal pair. This may be predetermined. For example, a transmission terminal may use a preceding bit and a reception terminal may use a following bit. Alternatively, the base station may notify information on which bit should be used to each terminal through additional signaling.

As another example, all K terminal pairs perform groupcast communication, each terminal pair may include one V2X transmission terminal and two or more V2X reception terminals. For example, each terminal pair may include N terminals. In this case, as shown in (b) of FIG. 17, the base station may transmit a command for transmission of a measurement signal (or transmission of sidelink control information and data information) or reception of the measurement signal (or reception of the sidelink control information and data information) through N bits to each terminal pair.

In more detail, it may be assumed that K=4 so that four terminal pairs exist and all of the terminal pairs perform groupcast communication. In this case, the base station may transmit group common DCI including 4 (four terminal pairs)×N (groupcast communication)=4N bits to the four groupcast terminal pairs.

Each terminal pair may receive the group common DCI for groupcast communication, by detecting an RNTI (e.g., a V2X groupcast group common RNTI) different from an RNTI (e.g., a C-RNTI) used in cellular communication, an RNTI (e.g., a V2X C-RNTI) UE-specifically transmitted to each terminal for sidelink communication, or an RNTI transmitted through the group common DCI to a unicast terminal pair.

In this case, the base station may notify, to each terminal pair, which part of the group common DCI should be used by the terminal pair through RRC signaling. For example, the base station may notify a start point by notifying that, from among the four terminal pairs, a first terminal pair should use the information from a first bit, a second terminal pair should use the information from a third bit, and a third terminal pair should use the information from a fifth bit.

Information on which bits from a start point should be used by each terminal pair is correlated with the number of terminals constituting each terminal pair. For example, when the number of terminals constituting each terminal pair is 5 in groupcast communication, 5 bits may be used from a start point (start bit) notified by the base station through RRC signaling. The number of terminals constituting each terminal pair in groupcast communication may be obtained in advance by each terminal through higher layer information in a V2X link configuration step, or may be obtained by the terminal through additional RRC signaling. In the above example, each terminal pair needs to know which bit from among the 5 bits should be used by the terminal pair. This may be pre-determined. For example, a V2X transmission terminal may use a foremost bit, and V2X reception terminals may use following bits. Alternatively, the base station may notify information on which bit should be used to each terminal through additional signaling.

In (a) and (b) of FIG. 17, the base station may notify a start point of group common DCI which should be used by each terminal pair, and a length of the group common DCI which should be used by each terminal pair may be fixed according to the number of terminals constituting each terminal pair. Bit information to be used by each terminal in each terminal pair may be determined in advance according to a function of the terminal constituting each terminal pair (i.e., a foremost bit is used by a transmission terminal and the remaining bits are used by reception terminal(s)), or may be notified by the base station to the terminal through additional signaling.

In (a) of FIG. 17, all K terminal pairs perform unicast communication, and in (b) of FIG. 17, all K terminal pairs perform groupcast communication. However, an embodiment of the present disclosure may be applied even when terminal pairs that perform unicast communication and groupcast communication coexist.

As shown in (c) of FIG. 17, it may be assumed that there are four terminal pairs, two terminal pairs perform unicast communication, and the remaining two terminal pairs perform group communication. Also, it may be assumed that, from among the two terminal pairs that perform groupcast communication, a first terminal pair include 5 terminals and a second terminal pair include 10 terminals. In this case, bits constituting group common DCI are as shown in (c) of FIG. 17.

(d) of FIG. 17 illustrates bits constituting group common DCI according to another embodiment.

In (d) of FIG. 17, it is assumed that a terminal pair that performs unicast communication and a terminal pair that performs groupcast communication coexist, like in (c) of FIG. 17. In this case, bit information to be used by each terminal pair may be notified by the base station through dedicated RRC signaling or common RRC signal to each terminal. For example, a first terminal pair may be a0, and a second terminal pair may be a1. In this case, the first terminal pair or the second terminal pair may perform unicast communication or groupcast communication.

When bit information to be used by each terminal pair is set to '1', a V2X transmission terminal may transmit a measurement signal. Alternatively, the V2X transmission terminal may transmit sidelink control information or data information. A V2X reception terminal may receive the measurement signal. Alternatively, the V2X reception terminal may receive the sidelink control information or the data information.

When bit information to be used by each terminal pair is set to '0', the V2X transmission terminal may not transmit the measurement signal. Alternatively, the V2X transmission terminal may not transmit the sidelink control information or the data information. The V2X reception terminal may not receive the measurement signal. Alternatively, the V2X reception terminal may not receive the sidelink control information or the data information.

Figure 18:
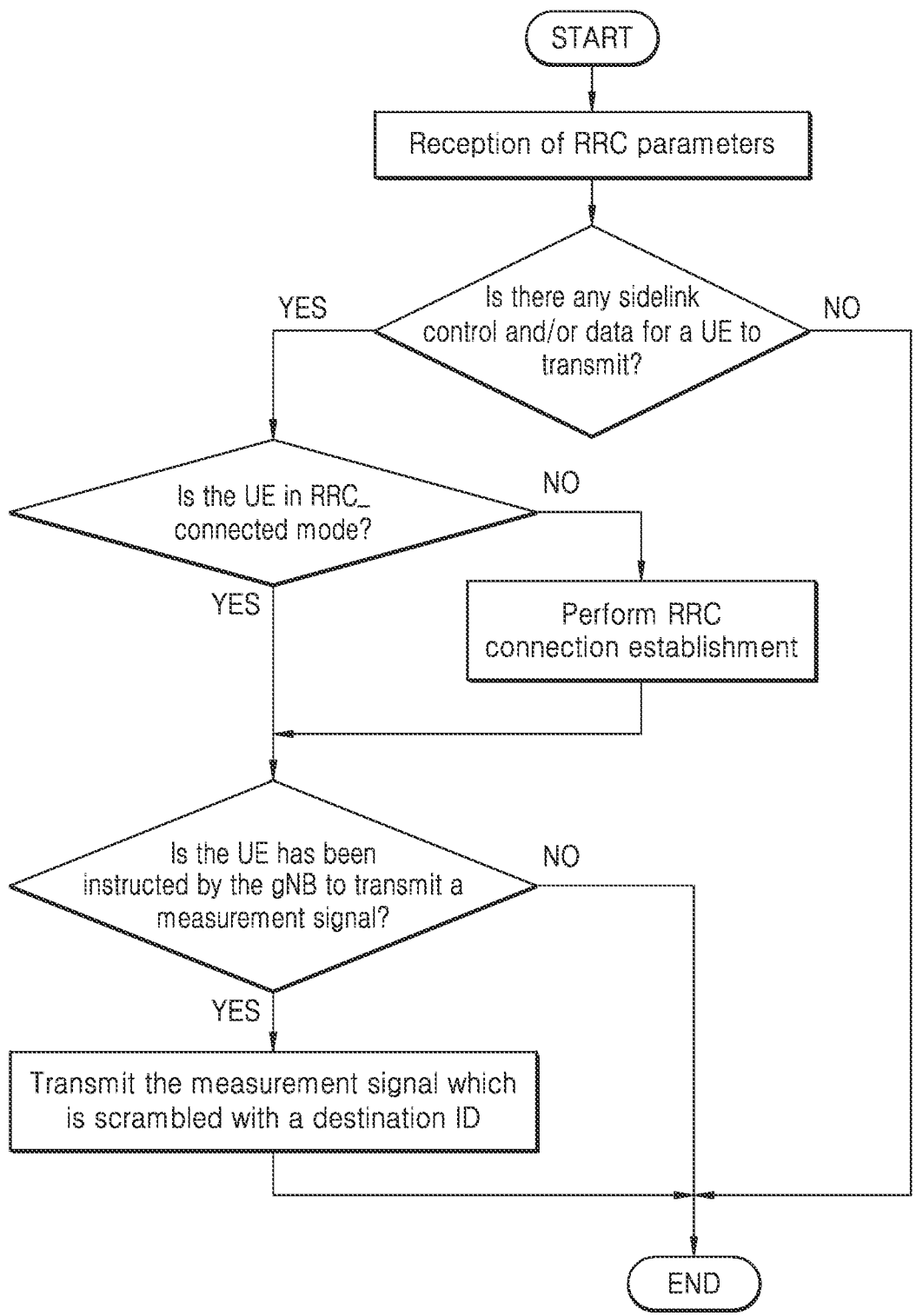
FIG. 18 is a diagram illustrating an operation and a procedure of a terminal for sidelink measurement, according to an embodiment of the present disclosure.

FIG. 18 is a diagram illustrating an operation and a procedure of a terminal for sidelink measurement, according to an embodiment of the present disclosure.

A terminal existing within coverage of a base station may receive a synchronization signal transmitted from the base station and may perform a downlink time-frequency synchronization procedure, and may receive information for sidelink measurement from the base station. The information for sidelink measurement may include at least one of, for example, a sequence index of a measurement signal, a time resource for transmitting the measurement signal, a frequency resource, and transmission periods. The information for sidelink measurement may be transmitted by the base station to the terminal through system information or a dedicated UE RRC parameter.

A terminal that is to perform sidelink measurement may determine whether there is sidelink control information or data information to be transmitted by the terminal via a sidelink. When there is no information, the terminal may not transmit a sidelink measurement signal, or when there is a measurement signal that is being transmitted, the terminal may stop transmitting the measurement signal. When there is the information, the terminal may determine a connected state with the base station.

When the terminal does not maintain a connected state with the base station (i.e., an RRC idle state), the terminal may perform an RRC connection configuration procedure to maintain the connected state with the base station.

When there is the sidelink control information or the data information to be transmitted via the sidelink, and the terminal maintains the connected state with the base station or performs a connection with the base station through the RRC connection configuration procedure, the terminal may determine whether a command for transmission of the measurement signal is received from the base station. The command for transmission of the measurement signal may be transmitted by the base station to the terminal through RRC signaling, a MAC CE, UE-specific DCI (see FIGS. 7 and 8), or group common DCI (see FIG. 17).

The terminal receiving the command for transmission of the measurement signal from the base station may transmit a measurement sequence scrambled by using a destination ID configured from a higher layer or a measurement sequence generated by using the destination ID. In this case, the measurement sequence may refer to a reference signal for sidelink channel quality measurement, and may refer to at least one of a DMRS of the sidelink control information or the data information, a sidelink synchronization signal, a DMRS of a sidelink broadcast channel, and a CSI-RS for a sidelink channel. Also, channel quality in channel quality measurement may refer to at least one of reference signal received power (RSRP), reference signal received quality (RSRQ), channel quality information (CQI), a rank indicator (RI), a precoder matrix indicator (PMI), a CSI-RS resource index (CRI), and a layer indicator (LI).

In the above example, when the sidelink measurement signal is a CSI-RS for measuring sidelink channel quality or a DMRS transmitted via a sidelink data channel, the sidelink measurement signal is always within a bandwidth of the sidelink data channel transmitted by a V2X transmission terminal. That is, when there is no sidelink data transmission, the V2X transmission terminal does not transmit the sidelink measurement signal. In this case, the bandwidth of the sidelink data channel may refer to a frequency width of the sidelink data channel scheduled through DCI by the base station for sidelink transmission. As another example, the bandwidth of the sidelink data channel may refer to a frequency width of a resource for transmitting a V2X sidelink data channel obtained by the V2X transmission terminal through a sensing process in a resource pool configured by the V2X transmission terminal through system information or RRC from the base station for sidelink transmission. In the above example, the sensing process may refer to energy measurement of a sidelink control channel or the sidelink data channel, or RSRP measurement from a DMRS transmitted via the sidelink control channel or the sidelink data channel. As another example, the sensing process may refer to a decoding process of control information transmitted via the sidelink control channel. As another example, the sensing process may refer to the above two operations (i.e., the energy measurement and the decoding process of control information).

A V2X reception terminal may receive and decode the sidelink control information from the V2X transmission terminal. The V2X reception terminal may obtain time and/or frequency resource information of the sidelink data channel from the decoded control information. The V2X reception terminal may indirectly derive information on a bandwidth in which the sidelink measurement signal is transmitted, through the obtained information. In this case, the V2X transmission terminal may not transmit additional information on the bandwidth of the sidelink measurement signal to the V2X reception terminal. As another example, the information on the bandwidth in which the sidelink measurement signal is transmitted may be transmitted by the V2X transmission terminal to the V2X reception terminal through the sidelink control information. Accordingly, in the above example, the V2X reception terminal may decode the sidelink control information and may obtain the information on the bandwidth of the sidelink measurement signal.

In FIG. 18, it has been assumed that both the V2X transmission terminal and the V2X reception terminal exist within coverage of the base station. Also, a resource allocation method in which the V2X transmission terminal operates in an RRC-connected state with the base station (the V2X transmission terminal is scheduled with a transmission resource of sidelink control information and data information from the base station) has been assumed. However, this is merely an example, and the present disclosure is not limited thereto. The V2X transmission terminal and the V2X reception terminal may operate in various situations.

For example, the V2X transmission terminal may exist within the coverage of the base station and the V2X reception terminal may exist outside the coverage. As another example, the V2X transmission terminal may exist within coverage of a base station-1, and the V2X reception terminal may exist within coverage of a base station-2. In this case, the procedure of FIG. 18 may be re-used.

Both the V2X transmission terminal and the V2X reception terminal may exist outside the coverage of the base station. In this case, the V2X transmission and reception terminals may not perform an RRC connection configuration with the base station. Accordingly, in this case, in FIG. 18, an operation of determining an RRC connection of a V2X terminal and an operation of determining whether there is an indication for transmission of a sidelink measurement signal from the base station may be omitted. That is, the V2X transmission terminal may determine whether there is sidelink control information and/or data information to be transmitted, and may transmit the sidelink measurement signal when there is the information. Otherwise, the V2X transmission terminal may not transmit the sidelink measurement signal, or when there is a sidelink measurement signal that is being transmitted, the V2X transmission terminal may stop transmitting the sidelink measurement signal.

Also, because the base station does not exist in the above example, the V2X transmission terminal may directly select a resource for the V2X transmission terminal through a sensing process in a pre-configured resource pool, as in FIGS. 7 and 8. In this case, in FIG. 18, an operation by which the V2X transmission terminal determines an RRC connection and an operation by which the V2X transmission terminal determines whether there is an indication for transmission of the sidelink measurement signal from the base station may be omitted. Also, an operation by which the V2X transmission terminal selects a resource of the sidelink control information and the data information to be transmitted by the V2X transmission terminal through a sensing process may be additionally included. The V2X transmission terminal may select a resource to be transmitted, and may transmit the sidelink measurement signal through one of the methods of FIG. 18.

As another example, the V2X transmission terminal may exist within coverage of the base station, but may operate in a state where there is no RRC connection configuration with the base station. In this case, the V2X transmission terminal may directly select a resource for the V2X transmission terminal through a sensing process in a resource pool configured by the base station, as described with reference to FIGS. 7 and 8. In this case, in FIG. 18, an operation by which the V2X transmission terminal determines an RRC connection and an operation by which the V2X transmission terminal determines whether there is an indication for transmission of the sidelink measurement signal from the base station may be omitted. Also, an operation by which the V2X transmission terminal selects a resource of the sidelink control information and the data information to be transmitted by the V2X transmission terminal through a sensing process may be additionally included. The V2X transmission terminal may select a resource to be transmitted, and may transmit the sidelink measurement signal through one of the methods of FIG. 18.

Figure 19:
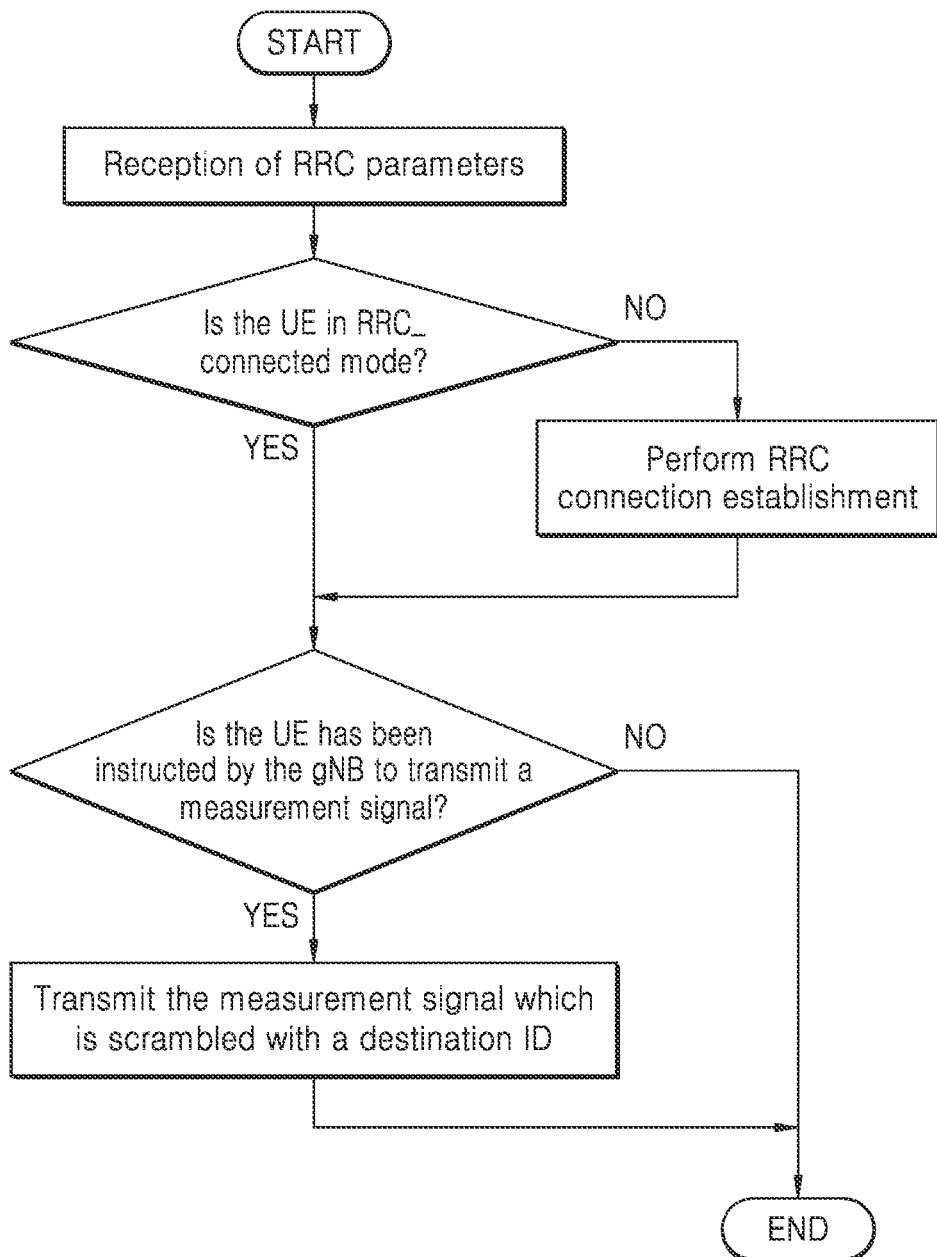
FIG. 19 is a diagram illustrating an operation and a procedure of a terminal for sidelink measurement, according to another embodiment of the present disclosure.

FIG. 19 is a diagram illustrating an operation and a procedure of a terminal for sidelink measurement, according to another embodiment of the present disclosure.

A terminal existing within coverage of a base station may receive a synchronization signal transmitted from the base station and may perform a downlink time-frequency synchronization procedure, and may receive information for sidelink measurement from the base station. The information for sidelink measurement may include at least one of, for example, a sequence index of a measurement signal, a time resource for transmitting the measurement signal, a frequency resource, and transmission periods. The information for sidelink measurement may be transmitted by the base station to the terminal through system information or a dedicated UE RRC parameter.

In FIG. 18, whether to perform sidelink measurement may be determined only for terminals in which there is sidelink control information or data information to be transmitted via a sidelink. However, FIG. 19 illustrates an operation of a terminal for performing sidelink measurement, even when there is no sidelink control information or data information to be transmitted via a sidelink. That is, the terminal existing within the coverage of the base station may determine a connected state with the base station.

When the terminal does not maintain a connected state with the base station (i.e., an RRC idle state), the terminal may perform an RRC connection configuration procedure to maintain the connected state with the base station. When the terminal maintains the connected state or the terminal performs connection with the base station through the RRC connection configuration procedure, the terminal may determine whether a command for transmission of the measurement signal is received from the base station. The command for transmission of the measurement signal may be transmitted by the base station to the terminal through RRC signaling, a MAC CE, UE-specific DCI (see FIGS. 7 and 8), or group common DCI (see FIG. 17).

The terminal receiving the command for transmission of the measurement signal from the base station may transmit a measurement sequence scrambled by using a destination ID configured from a higher layer or a measurement sequence generated by using the destination ID. In this case, the measurement sequence may refer to a reference signal for sidelink channel quality measurement, and may refer to at least one of a DMRS of the sidelink control information or the data information, a sidelink synchronization signal, a DMRS of a sidelink broadcast channel, and a CSI-RS for a sidelink channel. Also, channel quality in channel quality measurement may refer to at least one of reference signal received power (RSRP), reference signal received quality (RSRQ), channel quality information (CQI), a rank indicator (RI), a precoder matrix indicator (PMI), a CSI-RS resource index (CRI), and a layer indicator (LI).

In the above example, when the sidelink measurement signal is a CSI-RS for measuring sidelink channel quality or a DMRS transmitted via a sidelink data channel, the sidelink measurement signal is always within a bandwidth of the sidelink data channel transmitted by a V2X transmission terminal. That is, when there is no sidelink data transmission, the V2X transmission terminal does not transmit the sidelink measurement signal. In this case, the bandwidth of the sidelink data channel may refer to a frequency width of the sidelink data channel scheduled through DCI by the base station for sidelink transmission. As another example, the bandwidth of the sidelink data channel may refer to a frequency width of a resource for transmitting a V2X sidelink data channel obtained by the V2X transmission terminal through a sensing process in a resource pool configured by the V2X transmission terminal through system information or RRC from the base station for sidelink transmission. In the above example, the sensing process may refer to energy measurement of the sidelink control channel or the sidelink data channel, or RSRP measurement from a DMRS transmitted via the sidelink control channel or the sidelink data channel. As another example, the sensing process may refer to a decoding process of control information transmitted via the sidelink control channel. As another example, the sensing process may refer to the above two operations (i.e., the energy measurement and the decoding process of control information).

A V2X reception terminal may receive and decode the sidelink control information from the V2X transmission terminal. The V2X reception terminal may obtain time and/or frequency resource information of the sidelink data channel from the decoded control information. The V2X reception terminal may indirectly derive information on a bandwidth in which the sidelink measurement signal is transmitted, through the obtained information. In this case, the V2X transmission terminal may not transmit additional information on the bandwidth of the sidelink measurement signal to the V2X reception terminal. As another example, the information on the bandwidth in which the sidelink measurement signal is transmitted may be transmitted by the V2X transmission terminal to the V2X reception terminal through the sidelink control information. Accordingly, in the above example, the V2X reception terminal may decode the sidelink control information and may obtain the information on the bandwidth of the sidelink measurement signal.

In FIG. 18, it has been assumed that both the V2X transmission terminal and the reception terminal exist within coverage of the base station. Also, a resource allocation method in which the V2X transmission terminal operates in an RRC-connected state with the base station (the V2X transmission terminal is scheduled with a transmission resource of sidelink control information and data information from the base station) has been assumed. However, this is merely an example, and the present disclosure is not limited thereto. The V2X transmission terminal and the V2X reception terminal may operate in various situations.

For example, the V2X transmission terminal may exist within the coverage of the base station and the V2X reception terminal may exist outside the coverage. As another example, the V2X transmission terminal may exist within coverage of a base station-1, and the V2X reception terminal may exist within coverage of a base station-2. In this case, the procedure of FIG. 18 may be re-used.

Both the V2X transmission terminal and the V2X reception terminal may exist outside the coverage of the base station. In this case, the V2X transmission and reception terminals may not perform an RRC connection configuration with the base station. Accordingly, in this case, in FIG. 18, an operation of determining an RRC connection of a V2X terminal and an operation of determining whether there is an indication for transmission of a sidelink measurement signal from the base station may be omitted. That is, the V2X transmission terminal may determine whether there is sidelink control information and/or data information to be transmitted, and may transmit the sidelink measurement signal when there is the information. Otherwise, the V2X transmission terminal may not transmit the sidelink measurement signal, or when there is a sidelink measurement signal that is being transmitted, the V2X transmission terminal may stop transmitting the sidelink measurement signal.

Also, because the base station does not exist in the above example, the V2X transmission terminal may directly select a resource for the V2X transmission terminal through a sensing process in a pre-configured resource pool, as in FIGS. 7 and 8. In this case, in FIG. 18, an operation by which the V2X transmission terminal determines an RRC connection and an operation by which the V2X transmission terminal determines whether there is an indication for transmission of the sidelink measurement signal from the base station may be omitted. Also, an operation by which the V2X transmission terminal selects a resource of the sidelink control information and the data information to be transmitted by the V2X transmission terminal through a sensing process may be additionally included. The V2X transmission terminal may select a resource to be transmitted, and may transmit the sidelink measurement signal through one of the methods of FIG. 18.

As another example, the V2X transmission terminal may exist within coverage of the base station, but may operate in a state where there is no RRC connection configuration with the base station. In this case, the V2X transmission terminal may directly select a resource for the V2X transmission terminal through a sensing process in a resource pool configured by the base station, as described with reference to FIGS. 7 and 8. In this case, in FIG. 18, an operation by which the V2X transmission terminal determines an RRC connection and an operation by which the V2X transmission terminal determines whether there is an indication for transmission of the sidelink measurement signal from the base station may be omitted. Also, an operation by which the V2X transmission terminal selects a resource of the sidelink control information and the data information to be transmitted by the V2X transmission terminal through a sensing process may be additionally included. The V2X transmission terminal may select a resource to be transmitted, and may transmit the sidelink measurement signal through one of the methods of FIG. 18.

Although a signal for measurement is transmitted by a terminal (i.e., the V2X transmission terminal) that desires to transmit sidelink control information and data information in FIG. 18, an operation of FIG. 19 is not limited thereto. That is, not only a terminal (i.e., the V2X transmission terminal) that desires to transmit sidelink control information and data information but also a terminal (i.e., the V2X reception terminal) that desires to receive the sidelink control information and the data information may transmit a signal for measurement when a base station transmits a command for transmission of a measurement signal.

Figure 20:
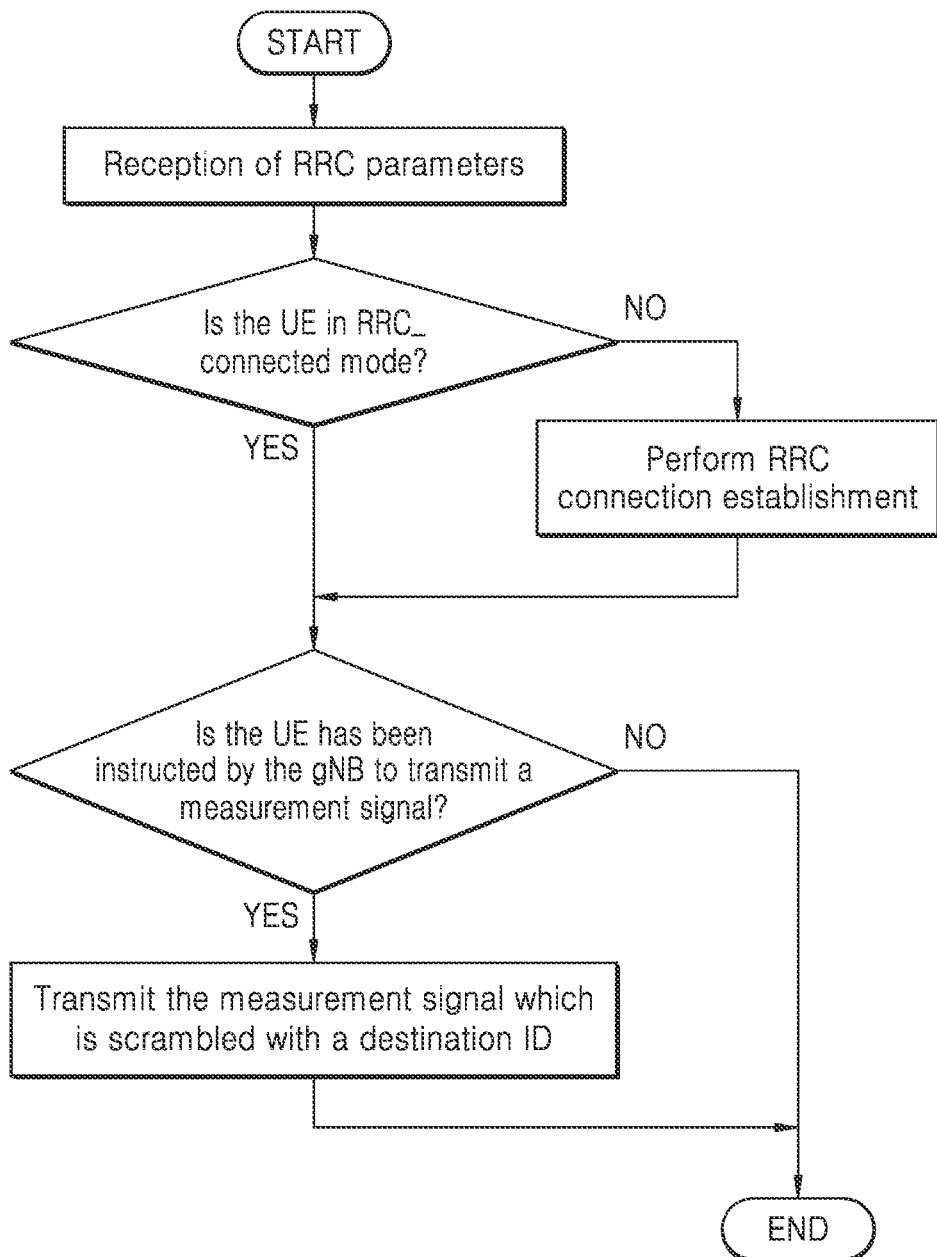
FIG. 20 is a diagram illustrating an operation and a procedure of a terminal for sidelink measurement, according to another embodiment of the present disclosure.

FIG. 20 is a diagram illustrating an operation and a procedure of a terminal for sidelink measurement, according to another embodiment of the present disclosure.

Although FIG. 20 has the same procedure as that of FIG. 18, FIG. 20 is different from FIG. 18 in that an entity that transmits a signal for measurement is a terminal that receives sidelink control information and data information. That is, although a terminal that transmits a sidelink in which sidelink control information and data information to be transmitted exist transmits a measurement signal in FIG. 18, in FIG. 20, a terminal that receives a sidelink in which sidelink control information and data information to be received exist transmits a measurement signal.

Accordingly, like in FIG. 20, in FIG. 20, a terminal existing within coverage of a base station may receive a synchronization signal transmitted from the base station and may perform a downlink time-frequency synchronization procedure, and may receive information for sidelink measurement from the base station. The information for sidelink measurement may include at least one of, for example, a sequence index of a measurement signal, a time resource for transmitting the measurement signal, a frequency resource, and transmission periods. The information for sidelink measurement may be transmitted by the base station to the terminal through system information or a dedicated UE RRC parameter.

A terminal that is to perform sidelink measurement may determine whether there is sidelink control information or data information to be transmitted by the terminal via a sidelink.

When there is no information, the terminal may not transmit a sidelink measurement signal, or when there is a measurement signal that is being transmitted, the terminal may stop transmitting the measurement signal. When there is the information, the terminal may determine a connected state with the base station.

When the terminal does not maintain a connected state with the base station (i.e., an RRC idle state), the terminal may perform an RRC connection configuration procedure to maintain the connected state with the base station.

When there is the sidelink control information or the data information to be transmitted via the sidelink, and the terminal maintains the connected state with the base station or performs a connection with the base station through the RRC connection configuration procedure, the terminal may determine whether a command for transmission of the measurement signal is received from the base station. The command for transmission of the measurement signal may be transmitted by the base station to the terminal through RRC signaling, a MAC CE, UE-specific DCI (see FIGS. 7 and 8), or group common DCI (see FIG. 17).

The terminal receiving the command for transmission of the measurement signal from the base station may transmit a measurement sequence scrambled by using a destination ID configured from a higher layer or a measurement sequence generated by using the destination ID.

In this case, the measurement sequence may refer to a reference signal for sidelink channel quality measurement, and may refer to at least one of a DMRS of the sidelink control information or the data information, a sidelink synchronization signal, a DMRS of a sidelink broadcast channel, and a CSI-RS for a sidelink channel. Also, channel quality in channel quality measurement may refer to at least one of reference signal received power (RSRP), reference signal received quality (RSRQ), channel quality information (CQI), a rank indicator (RI), a precoder matrix indicator (PMI), a CSI-RS resource index (CRI), and a layer indicator (LI).

In the above example, when the sidelink measurement signal is a CSI-RS for measuring sidelink channel quality or a DMRS transmitted via a sidelink data channel, the sidelink measurement signal is always within a bandwidth of the sidelink data channel transmitted by a V2X transmission terminal. That is, when there is no sidelink data transmission, the V2X transmission terminal does not transmit the sidelink measurement signal. In this case, the bandwidth of the sidelink data channel may refer to a frequency width of the sidelink data channel scheduled by the V2X transmission terminal through DCI by the base station for sidelink transmission. As another example, the bandwidth of the sidelink data channel may refer to a frequency width of a resource for transmitting a V2X sidelink data channel obtained by the V2X transmission terminal through a sensing process in a resource pool configured by the V2X transmission terminal through system information or RRC from the base station for sidelink transmission. In the above example, the sensing process may refer to energy measurement of a sidelink control channel or a sidelink data channel, or RSRP measurement from a DMRS transmitted via the sidelink control channel or the sidelink data channel. As another example, the sensing process may refer to a decoding process of control information transmitted via the sidelink control channel. As another example, the sensing process may refer to the above two operations (i.e., the energy measurement and the decoding process of control information).

A V2X reception terminal may receive and decode the sidelink control information from the V2X transmission terminal. The V2X reception terminal may obtain time and/or frequency resource information of the sidelink data channel from the coded control information. The V2X reception terminal may indirectly derive information on a bandwidth in which the sidelink measurement signal is transmitted, through the obtained information. In this case, the V2X transmission terminal may not transmit additional information on the bandwidth of the sidelink measurement signal to the V2X reception terminal. As another example, the information on the bandwidth in which the sidelink measurement signal is transmitted may be transmitted by the V2X transmission terminal to the V2X reception terminal through the sidelink control information. Accordingly, in the above example, the V2X reception terminal may decode the sidelink control information and may obtain the information on the bandwidth of the sidelink measurement signal.

In FIG. 18, it has been assumed that both the V2X transmission terminal and the reception terminal exist within coverage of the base station. Also, a resource allocation method in which the V2X transmission terminal operates in an RRC-connected state with the base station (the V2X transmission terminal is scheduled with a transmission resource of sidelink control information and data information from the base station) has been assumed. However, this is merely an example, and the present disclosure is not limited thereto. The V2X transmission terminal and the V2X reception terminal may operate in various situations.

For example, the V2X transmission terminal may exist within the coverage of the base station and the V2X reception terminal may exist outside the coverage. As another example, the V2X transmission terminal may exist within coverage of a base station-1, and the V2X reception terminal may exist within coverage of a base station-2. In this case, the procedure of FIG. 18 may be re-used.

Both the V2X transmission terminal and the V2X reception terminal may exist outside the coverage of the base station. In this case, the V2X transmission and reception terminals may not perform an RRC connection configuration with the base station. Accordingly, in this case, in FIG. 18, an operation of determining an RRC connection of a V2X terminal and an operation of determining whether there is an indication for transmission of a sidelink measurement signal from the base station may be omitted. That is, the V2X transmission terminal may determine whether there is sidelink control information and/or data information to be transmitted, and may transmit the sidelink measurement signal when there is the information. Otherwise, the V2X transmission terminal may not transmit the sidelink measurement signal, or when there is a sidelink measurement signal that is being transmitted, the V2X transmission terminal may stop transmitting the sidelink measurement signal.

Also, because the base station does not exist in the above example, the V2X transmission terminal may directly select a resource for the V2X transmission terminal through a sensing process in a pre-configured resource pool, as in FIGS. 7 and 8. In this case, in FIG. 18, an operation by which the V2X transmission terminal determines an RRC connection and an operation by which the V2X transmission terminal determines whether there is an indication for transmission of the sidelink measurement signal from the base station may be omitted. Also, an operation by which the V2X transmission terminal selects a resource of the sidelink control information and the data information to be transmitted by the V2X transmission terminal through a sensing process may be additionally included. The V2X transmission terminal may select a resource to be transmitted, and may transmit the sidelink measurement signal through one of the methods of FIG. 18.

As another example, the V2X transmission terminal may exist within coverage of the base station, but may operate in a state where there is no RRC connection configuration with the base station. In this case, the V2X transmission terminal may directly select a resource for the V2X transmission terminal through a sensing process in a resource pool configured by the base station, as described with reference to FIGS. 7 and 8. In this case, in FIG. 18, an operation by which the V2X transmission terminal determines an RRC connection and an operation by which the V2X transmission terminal determines whether there is an indication for transmission of the sidelink measurement signal from the base station may be omitted. Also, an operation by which the V2X transmission terminal selects a resource of the sidelink control information and the data information to be transmitted by the V2X transmission terminal through a sensing process may be additionally included. The V2X transmission terminal may select a resource to be transmitted, and may transmit the sidelink measurement signal through one of the methods of FIG. 18.

Figure 21:
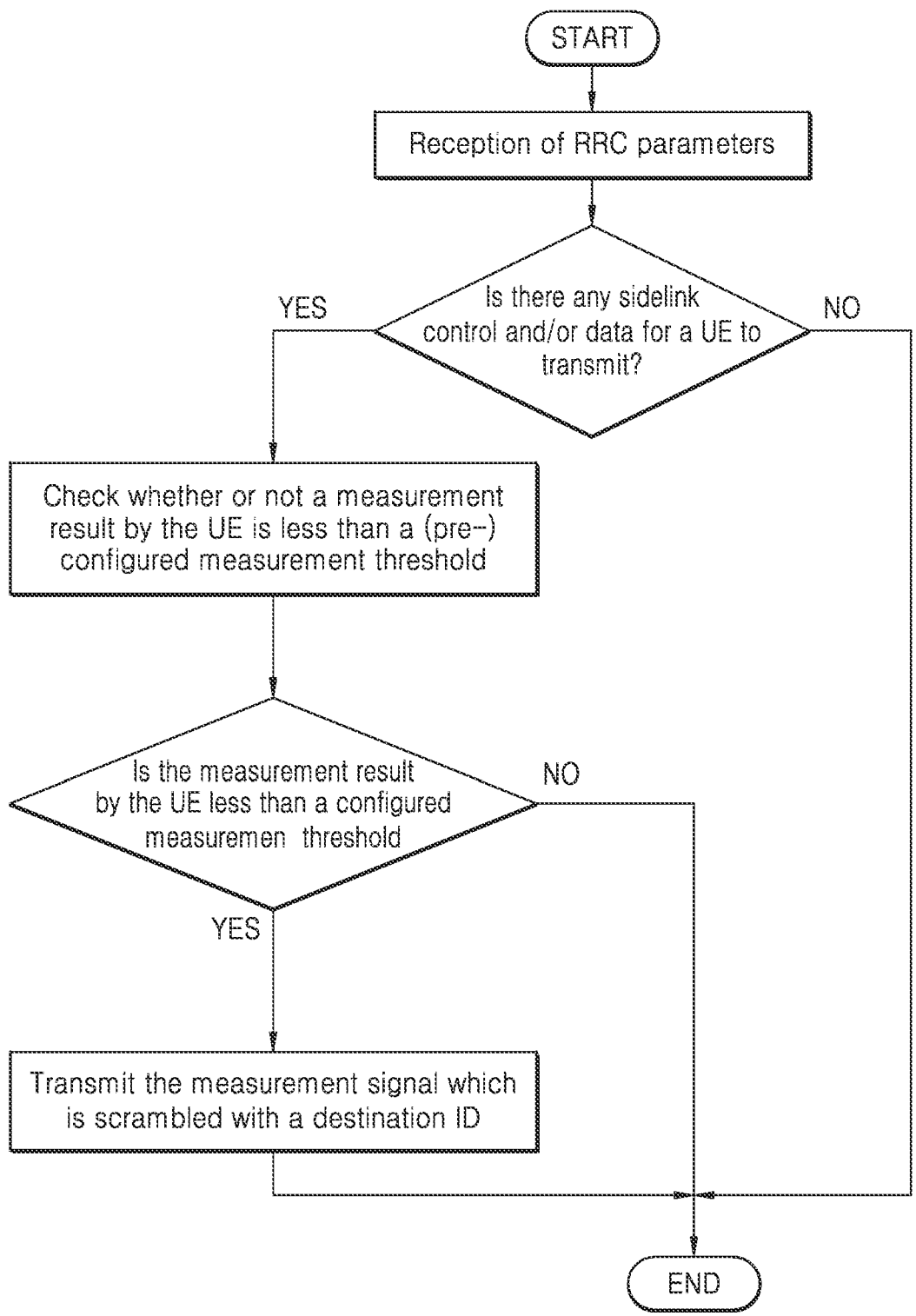
FIG. 21 is a diagram illustrating an operation and a procedure of a terminal for sidelink measurement, according to another embodiment of the present disclosure.

FIG. 21 is a diagram illustrating an operation and a procedure of a terminal for sidelink measurement, according to another embodiment of the present disclosure.

A terminal existing within coverage of a base station may receive a synchronization signal transmitted from the base station and may perform a downlink time-frequency synchronization procedure, and may receive information for sidelink measurement from the base station. The information for sidelink measurement may include at least one of, for example, a sequence index of a measurement signal, a time resource for transmitting the measurement signal, a frequency resource, and transmission periods. The information for sidelink measurement may be transmitted by the base station to the terminal through system information or a dedicated UE RRC parameter.

FIG. 21 may also be applied to terminals with no coverage of the base station. In this case, because the terminal may not receive parameters for measurement signal transmission and reception through system information or UE dedicated RRC signaling from the base station, the terminal may use pre-defined (preconfigured) parameters.

A terminal that is to perform sidelink measurement may determine whether there is sidelink control information or data information to be transmitted by the terminal via a sidelink.

When there is no information, the terminal may not transmit a sidelink measurement signal, or when there is a measurement signal that is being transmitted, the terminal may stop transmitting the measurement signal.

When there is the information, the terminal may determine whether to transmit the measurement signal by comparing a measurement result previously performed by the terminal with a threshold value preconfigured (or pre-defined) by the base station.

That is, when the measurement result previously performed by the terminal is less than the threshold value, the terminal may transmit a signal for measurement. Otherwise, the terminal may not transmit the measurement signal.

In this case, the measurement result may be one of RSRP measured from a DMRS of a control channel, RSRP measured from a DMRS of a data channel, RSRP measured from a sidelink synchronization signal for performing sidelink synchronization, RSRP measured from a DMRS of a sidelink broadcast channel, and a channel state information-reference signal (CSI-RS) for measuring sidelink channel quality.

A terminal receiving the measurement signal may perform measurement by using measurement information configured by the base station or pre-defined measurement information. The measurement information configured by the base station may include at least one of, for example, a sequence index of the measurement signal, a time resource for receiving the measurement signal, a frequency resource, and transmission periods.

After performing the measurement, the terminal may report a measurement result to the terminal transmitting the measurement signal or the base station. A resource for reporting the measurement result may be notified by the terminal transmitting the measurement signal or the base station, or may be derived by the terminal receiving the measurement signal through an association relationship with a resource in which the measurement signal is transmitted, as described with reference to FIGS. 7 and 8. In this case, the measurement result may not always be reported, but the measurement result may be reported to the terminal transmitting the measurement signal or the base station only when the measurement result measured by the terminal receiving the measurement signal is equal to or less than a threshold value configured (or pre-defined) by the base station.

In the above example, when the sidelink measurement signal is a CSI-RS for measuring sidelink channel quality or a DMRS transmitted via a sidelink data channel, the sidelink measurement signal is always within a bandwidth of the sidelink data channel transmitted by a V2X transmission terminal. When there is no sidelink data transmission, the V2X transmission terminal does not transmit the sidelink measurement signal. In this case, the bandwidth of the sidelink data channel may refer to a frequency width of the sidelink data channel scheduled through DCI by the base station for sidelink transmission. As another example, the bandwidth of the sidelink data channel may refer to a frequency width of a resource for transmitting a V2X sidelink data channel obtained by the V2X transmission terminal through a sensing process in a resource pool configured through system information or RRC from the base station for sidelink transmission. In the above example, the sensing process may refer to energy measurement of a sidelink control channel or the sidelink data channel, or RSRP measurement from a DMRS transmitted via the sidelink control channel or the sidelink data channel. As another example, the sensing process may refer to a decoding process of control information transmitted via the sidelink control channel. As another example, the sensing process may refer to the above two operations (i.e., the energy measurement and the decoding process of control information).

A V2X reception terminal may receive and decode sidelink control information from the V2X transmission terminal. The V2X reception terminal may obtain time and/or frequency resource information of the sidelink data channel from the decoded control information. The V2X reception terminal may indirectly derive information on a bandwidth in which the sidelink measurement signal is transmitted, through the obtained information. In this case, the V2X transmission terminal may not transmit additional information on the bandwidth of the sidelink measurement signal to the V2X reception terminal. As another example, the information on the bandwidth in which the sidelink measurement signal is transmitted may be transmitted to the V2X reception terminal through the sidelink control information. Accordingly, in the above example, the V2X reception terminal may decode the sidelink control information and may obtain the information on the bandwidth of the sidelink measurement signal.

In FIG. 18, it has been assumed that both the V2X transmission terminal and the V2X reception terminal exist within coverage of the base station. Also, a resource allocation method in which the V2X transmission terminal operates in an RRC-connected state with the base station (the V2X transmission terminal is scheduled with a transmission resource of sidelink control information and data information from the base station) has been assumed. However, this is merely an example, and the present disclosure is not limited thereto. The V2X transmission terminal and the V2X reception terminal may operate in various situations.

For example, the V2X transmission terminal may exist within the coverage of the base station and the V2X reception terminal may exist outside the coverage. As another example, the V2X transmission terminal may exist within coverage of a base station-1, and the V2X reception terminal may exist within coverage of a base station-2. In this case, the procedure of FIG. 18 may be re-used.

Both the V2X transmission terminal and the V2X reception terminal may exist outside the coverage of the base station. In this case, the V2X transmission and reception terminals may not perform an RRC connection configuration with the base station. Accordingly, in this case, in FIG. 18, an operation of determining an RRC connection of a V2X terminal and an operation of determining whether there is an indication for transmission of a sidelink measurement signal from the base station may be omitted. That is, the V2X transmission terminal may determine whether there is sidelink control information and/or data information to be transmitted, and may transmit the sidelink measurement signal when there is the information. Otherwise, the V2X transmission terminal may not transmit the sidelink measurement signal, or when there is a sidelink measurement signal that is being transmitted, the V2X transmission terminal may stop transmitting the sidelink measurement signal.

Also, because the base station does not exist in the above example, the V2X transmission terminal may directly select a resource for the V2X transmission terminal through a sensing process in a pre-configured resource pool, as in FIGS. 7 and 8. In this case, in FIG. 18, an operation by which the V2X transmission terminal determines an RRC connection and an operation by which the V2X transmission terminal determines whether there is an indication for transmission of the sidelink measurement signal from the base station may be omitted. Also, an operation by which the V2X transmission terminal selects a resource of the sidelink control information and the data information to be transmitted by the V2X transmission terminal through a sensing process may be additionally included. The V2X transmission terminal may select a resource to be transmitted, and may transmit the sidelink measurement signal through one of the methods of FIG. 18.

As another example, the V2X transmission terminal may exist within coverage of the base station, but may operate in a state where there is no RRC connection configuration with the base station. In this case, the V2X transmission terminal may directly select a resource for the V2X transmission terminal through a sensing process in a resource pool configured by the base station, as described with reference to FIGS. 7 and 8. In this case, in FIG. 18, an operation by which the V2X transmission terminal determines an RRC connection and an operation by which the V2X transmission terminal determines whether there is an indication for transmission of the sidelink measurement signal from the base station may be omitted. Also, an operation by which the V2X transmission terminal selects a resource of the sidelink control information and the data information to be transmitted by the V2X transmission terminal through a sensing process may be additionally included. The V2X transmission terminal may select a resource to be transmitted, and may transmit the sidelink measurement signal through one of the methods of FIG. 18.

Figure 22:
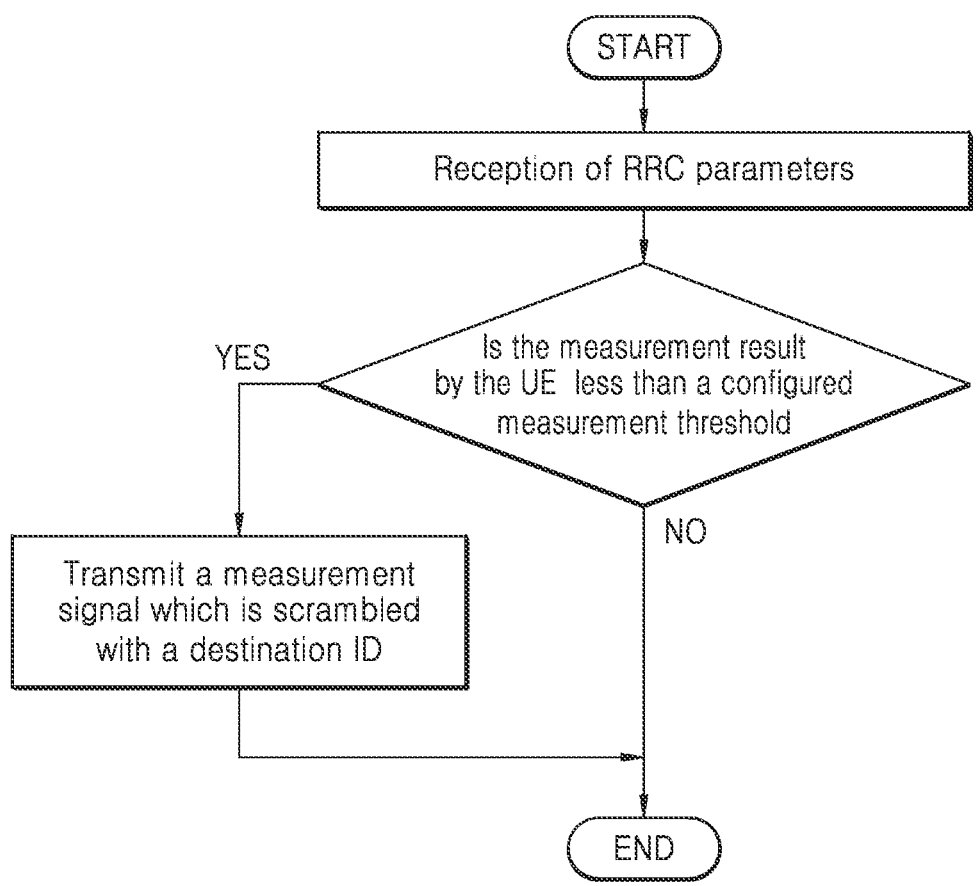
FIG. 22 is a diagram illustrating an operation and a procedure of a terminal for sidelink measurement, according to another embodiment of the present disclosure.

FIG. 22 is a diagram illustrating an operation and a procedure of a terminal for sidelink measurement, according to another embodiment of the present disclosure.

Although a terminal that is to transmit sidelink control information and data information determines whether to transmit a measurement signal in FIG. 21, in FIG. 22, a terminal that is to receive sidelink control information and data information determines whether to transmit a measurement signal.

In more detail, a terminal existing within coverage of a base station may receive a synchronization signal transmitted from the base station and may perform a downlink time-frequency synchronization procedure, and may receive information for sidelink measurement from the base station. The information for sidelink measurement may include at least one of, for example, a sequence index of a measurement signal, a time resource for transmitting the measurement signal, a frequency resource, and transmission periods. The information for sidelink measurement may be transmitted by the base station to the terminal through system information or a dedicated UE RRC parameter.

Like in FIG. 21, an embodiment of FIG. 22 may also be applied to terminals with no coverage of the base station. In this case, because the terminal may not receive parameters for measurement signal transmission and reception through system information or UE dedicated RRC signaling from the base station, the terminal may use pre-defined (preconfigured) parameters.

A terminal that is to perform sidelink measurement may determine whether there is sidelink control information or data information to be transmitted by the terminal via a sidelink.

When there is no information, the terminal may not transmit a sidelink measurement signal, or when there is a measurement signal that is being transmitted, the terminal may stop transmitting the measurement signal.

When there is the information, the terminal may determine whether to transmit the measurement signal by comparing a measurement result previously performed by the terminal with a threshold value preconfigured (or pre-defined) by the base station. That is, when the measurement result previously performed by the terminal is less than the threshold value, the terminal may transmit a signal for measurement. Otherwise, the terminal may not transmit the measurement signal.

A terminal receiving the measurement signal may perform measurement by using measurement information configured by the base station or pre-defined measurement information. The measurement information configured by the base station may include at least one of, for example, a sequence index of the measurement signal, a time resource for receiving the measurement signal, a frequency resource, and transmission periods. After performing the measurement, the terminal may report a measurement result to the terminal transmitting the measurement signal or the base station.

A resource for reporting the measurement result may be notified by the terminal transmitting the measurement signal or the base station, or may be derived by the terminal receiving the measurement signal through an association relationship with a resource in which the measurement signal is transmitted, as described with reference to FIGS. 7 and 8. In this case, the measurement result may not always be reported, but the measurement result may be reported to the terminal transmitting the measurement signal or the base station only when the measurement result measured by the terminal receiving the measurement signal is equal to or less than a threshold value configured (or pre-defined) by the base station.

In FIG. 21, a terminal that is to transmit sidelink control information and data information compares a measurement result that is previously performed by the terminal with a threshold value. In FIG. 22, a terminal that is to receive sidelink control information and data information compares a measurement result that is previously performed by the terminal with a threshold value. However, this comparison procedure may be performed by a command of the base station, regardless of transmission/reception of sidelink control information and data information. That is, the base station may indicate a terminal to perform an operation of comparing a measurement result with a threshold value through UE specific RRC signaling, a MAC CE, or DCI.

Also, a procedure of comparing a measurement result that is previously performed by a terminal with a threshold value is illustrated in FIGS. 21 and 22, the present disclosure is not limited thereto. That is, the terminal may compare an MCS of sidelink control information and data information that is previously transmitted with a threshold value. In this case, it is obvious that the threshold value is related to the MCS.

In the above example, when the sidelink measurement signal is a CSI-RS for measuring sidelink channel quality or a DMRS transmitted via a sidelink data channel, the sidelink measurement signal is always within a bandwidth of the sidelink data channel transmitted by a V2X transmission terminal. When there is no sidelink data transmission, the V2X transmission terminal does not transmit the sidelink measurement signal. In this case, the bandwidth of the sidelink data channel may refer to a frequency width of the sidelink data channel scheduled through DCI by the base station for sidelink transmission. As another example, the bandwidth of the sidelink data channel may refer to a frequency width of a resource for transmitting a V2X sidelink data channel obtained by the V2X transmission terminal through a sensing process in a resource pool configured through system information or RRC from the base station for sidelink transmission. In the above example, the sensing process may refer to energy measurement of a sidelink control channel or the sidelink data channel, or RSRP measurement from a DMRS transmitted via the sidelink control channel or the sidelink data channel. As another example, the sensing process may refer to a decoding process of control information transmitted via the sidelink control channel. As another example, the sensing process may refer to the above two operations (i.e., the energy measurement and the decoding process of control information).

A V2X reception terminal may receive and decode sidelink control information from the V2X transmission terminal. The V2X reception terminal may obtain time and/or frequency resource information of the sidelink data channel from the decoded control information. The V2X reception terminal may indirectly derive information on a bandwidth in which the sidelink measurement signal is transmitted, through the obtained information. In this case, the V2X transmission terminal may not transmit additional information on the bandwidth of the sidelink measurement signal to the V2X reception terminal. As another example, the information on the bandwidth in which the sidelink measurement signal is transmitted may be transmitted by the V2X transmission terminal to the V2X reception terminal through the sidelink control information. Accordingly, in the above example, the V2X reception terminal may decode the sidelink control information and may obtain the information on the bandwidth of the sidelink measurement signal.

In FIG. 18, it has been assumed that both the V2X transmission terminal and the V2X reception terminal exist within coverage of the base station. Also, a resource allocation method in which the V2X transmission terminal operates in an RRC-connected state with the base station (the V2X transmission terminal is scheduled with a transmission resource of sidelink control information and data information from the base station) has been assumed. However, this is merely an example, and the present disclosure is not limited thereto. The V2X transmission terminal and the V2X reception terminal may operate in various situations.

For example, the V2X transmission terminal may exist within the coverage of the base station and the V2X reception terminal may exist outside the coverage. As another example, the V2X transmission terminal may exist within coverage of a base station-1, and the V2X reception terminal may exist within coverage of a base station-2. In this case, the procedure of FIG. 18 may be re-used.

Both the V2X transmission terminal and the V2X reception terminal may exist outside the coverage of the base station. In this case, the V2X transmission and reception terminals may not perform an RRC connection configuration with the base station. Accordingly, in this case, in FIG. 18, an operation of determining an RRC connection of a V2X terminal and an operation of determining whether there is an indication for transmission of a sidelink measurement signal from the base station may be omitted. That is, the V2X transmission terminal may determine whether there is sidelink control information and/or data information to be transmitted, and may transmit the sidelink measurement signal when there is the information. Otherwise, the V2X transmission terminal may not transmit the sidelink measurement signal, or when there is a sidelink measurement signal that is being transmitted, the V2X transmission terminal may stop transmitting the sidelink measurement signal.

Also, because the base station does not exist in the above example, the V2X transmission terminal may directly select a resource for the V2X transmission terminal through a sensing process in a pre-configured resource pool, as in FIGS. 7 and 8. In this case, in FIG. 18, an operation by which the V2X transmission terminal determines an RRC connection and an operation by which the V2X transmission terminal determines whether there is an indication for transmission of the sidelink measurement signal from the base station may be omitted. Also, an operation by which the V2X transmission terminal selects a resource of the sidelink control information and the data information to be transmitted by the V2X transmission terminal through a sensing process may be additionally included. The V2X transmission terminal may select a resource to be transmitted, and may transmit the sidelink measurement signal through one of the methods of FIG. 18.

As another example, the V2X transmission terminal may exist within coverage of the base station, but the V2X transmission terminal may operate in a state where there is no RRC connection configuration with the base station. In this case, the V2X transmission terminal may directly select a resource for the V2X transmission terminal through a sensing process in a resource pool configured by the base station, as described with reference to FIGS. 7 and 8. In this case, in FIG. 18, an operation by which the V2X transmission terminal determines an RRC connection and an operation by which the V2X transmission terminal determines whether there is an indication for transmission of the sidelink measurement signal from the base station may be omitted. Also, an operation by which the V2X transmission terminal selects a resource of the sidelink control information and the data information to be transmitted by the V2X transmission terminal through a sensing process may be additionally included. The V2X transmission terminal may select a resource to be transmitted, and may transmit the sidelink measurement signal through one of the methods of FIG. 18.

Figure 23:
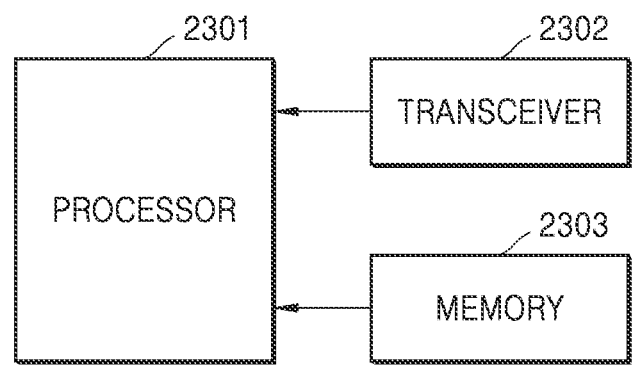
FIG. 23 is a diagram illustrating a structure of a terminal, according to an embodiment of the present disclosure.

FIG. 23 is a diagram illustrating a structure of a terminal, according to an embodiment of the present disclosure.

The terminal according to an embodiment of the present disclosure described with reference to FIG. 23 may be a transmission terminal or a reception terminal. Also, the transmission terminal may be referred to as a V2X transmission terminal, and the reception terminal may be referred to as a V2X reception terminal.

Referring to FIG. 23, a terminal may include a processor 2301, a transceiver 2302, and a memory 2303. The processor in the present disclosure may be defined as a circuit, an application-specific integrated circuit, or at least one processor.

The processor 2301 according to an embodiment of the present disclosure may control an overall operation of the terminal. For example, the processor 2301 may control a signal flow between blocks to perform an operation according to the above flowchart. Also, the processor 2301 may write and read data to and from the memory 2303. The processor 2301 may perform functions of a protocol stack required by a communication standard. To this end, the processor 2301 may include at least one processor or microprocessor. Alternatively, the processor 2301 may be a part of a processor. Also, a part of the transceiver 2302 and the processor 2301 may be referred to as a communication processor (CP).

According to an embodiment of the present disclosure, the processor 2301 may control operations of the terminal described with reference to FIGS. 1 through 23.

The processor 2301 according to an embodiment of the present disclosure may improve the reliability of data transmission/reception and increase a data rate by adaptively adjusting a link parameter between terminals according to a channel environment in a vehicle communication system, through a method of measuring link quality between terminals according to the present embodiment. Accordingly, the processor 2301 may support more efficient communication between terminals.

The transceiver 2302 according to an embodiment of the present disclosure may perform functions for transmitting/ receiving a signal via a wireless channel. For example, the transceiver 2302 may perform a function of conversion between a bit string and a baseband signal according to a physical layer standard of a system. For example, during data transmission, the transceiver 2302 may generate complex symbols by encoding and modulating a transmission bit string. Also, during data reception, the transceiver 2302 may reconstruct a reception bit string by demodulating and decoding a baseband signal. Also, the transceiver 2302 may up-convert a baseband signal into a radio frequency (RF) band signal and then may transmit the signal through an antenna, and may down-convert an RF band signal received through an antenna into a baseband signal. For example, the transceiver 2302 may include a transmission filter, a reception filter, an amplifier, a mixer, an oscillator, a digital-to-analog converter (DAC), and an analog-to-digital converter (ADC). Also, the transceiver 2302 may include a plurality of transmission/reception paths. Furthermore, the transceiver 2302 may include at least one antenna array including a plurality of antenna elements. When implemented using hardware, the transceiver 2302 may include a digital circuit and an analog circuit (e.g., a radio frequency integrated circuit (RFIC)). The digital circuit and the analog circuit may be implemented as one package. Also, the transceiver 2302 may include a plurality of RF chains.

The memory 2303 according to an embodiment of the present disclosure may store data such as a basic program, an application program, and configuration information for an operation of the terminal. The memory 2303 may include a volatile memory, a nonvolatile memory, or a combination of a volatile memory and a nonvolatile memory. The memory 2303 may provide stored data according to a request of the processor 2301. The memory 2303 may store at least one of information transmitted/received through the transceiver 2302 and information generated through the processor 2301.

Figure 24:
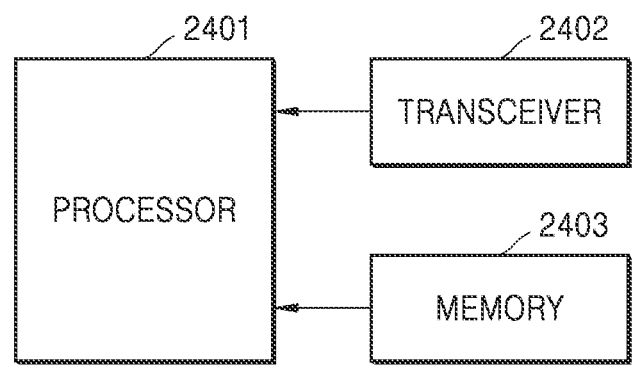
FIG. 24 is a diagram illustrating a structure of a base station, according to an embodiment of the present disclosure.

FIG. 24 is a diagram illustrating a structure of a base station, according to an embodiment of the present disclosure.

Referring to FIG. 24, a base station may include a processor 2401, a transceiver 2402, and a memory 2403. The processor in the present disclosure may be defined as a circuit, an application-specific integrated circuit, or at least one processor.

The processor 2401 according to an embodiment of the present disclosure may control an overall operation of the base station. For example, the processor 2401 may control a signal flow between blocks to perform an operation according to the above flowchart. Also, the processor 2401 may write and read data to and from the memory 2403. The processor 2401 may perform functions of a protocol stack required by a communication standard. To this end, the processor 2401 may include at least one processor or microprocessor. Alternatively, the processor 2401 may be a part of a processor. Also, a part of the transceiver 2402 and the processor 2401 may be referred to as a communication processor (CP).

According to an embodiment of the present disclosure, the processor 2401 may control operations of the base station described with reference to FIGS. 1 through 23.

The processor 2401 according to an embodiment of the present disclosure may improve the reliability of data transmission/reception and increase a data rate by adaptively adjusting a link parameter between terminals according to a channel environment in a vehicle communication system, through a method of measuring link quality between terminals according to the present embodiment. Accordingly, the processor 2401 may support more efficient communication between terminals.

The transceiver 2402 according to an embodiment of the present disclosure may perform functions for transmitting/receiving a signal via a wireless channel. For example, the transceiver 2402 may perform a function of conversion between a bit string and a baseband signal according to a physical layer standard of a system. For example, during data transmission, the transceiver 2402 may generate complex symbols by encoding and modulating a transmission bit string. Also, during data reception, the transceiver 2402 may reconstruct a reception bit string by demodulating and decoding a baseband signal. Also, the transceiver 2402 may up-convert a baseband signal into an RF band signal and then may transmit the signal through an antenna, and may down-convert an RF band signal received through an antenna into a baseband signal. For example, the transceiver 2402 may include a transmission filter, a reception filter, an amplifier, a mixer, an oscillator, a DAC, and an ADC. Also, the transceiver 2402 may include a plurality of transmission/reception paths. Furthermore, the transceiver 2402 may include at least one antenna array including a plurality of antenna elements. When implemented using hardware, the transceiver 2402 may include a digital circuit and an analog circuit (e.g., a radio frequency integrated circuit (RFIC)). The digital circuit and the analog circuit may be implemented as one package. Also, the transceiver 2402 may include a plurality of RF chains.

The memory 2403 according to an embodiment of the present disclosure may store data such as a basic program, an application program, and configuration information for an operation of the base station. The memory 2403 may include a volatile memory, a nonvolatile memory, or a combination of a volatile memory and a nonvolatile memory. The memory 2403 may provide stored data according to a request of the processor 2401. The memory 2403 may store at least one of information transmitted/received through the transceiver 2402 and information generated through the processor 2401.

The methods according to the claims or embodiments of the present disclosure described herein may be implemented in the form of hardware, software, or a combination of hardware and software.

When the methods are implemented by software, a computer-readable storage medium or a computer program product for storing one or more programs (software modules) may be provided. The one or more programs stored in the computer-readable storage medium or the computer program product are configured to be executable by one or more processors in an electronic device. The one or more programs include instructions for allowing the electronic device to execute the methods according to the claims or embodiments of the present disclosure described herein.

These programs (software modules or software) may be stored in a random-access memory (RAM), a non-volatile memory including a flash memory, a read-only memory (ROM), an electrically erasable programmable read only memory (EEPROM), a magnetic disc storage device, a compact disc (CD)-ROM, a digital versatile disc (DVD), another optical storage device, or a magnetic cassette. Alternatively, the programs may be stored in a memory configured by combining some or all of them. Also, each constituent memory may include a plurality of memories.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may connect to a device according to embodiments of the present disclosure through an external port. Also, a separate storage device on a communication network may connect to a device according to embodiments of the present disclosure.

In specific embodiments of the present disclosure described above, components included in the present disclosure were expressed as singular or plural in accordance with the specific embodiments of the present disclosure set forth. However, singular or plural representations are selected appropriately for the sake of convenience of description, the present disclosure is not limited to the singular or plural constituent elements, and even expressed as a singular element, it may be composed of plural elements, and vice versa.

The present disclosure may, however, be embodied in different forms and should not be construed as limited to embodiments of the present disclosure set forth herein; rather, these embodiments of the present disclosure are provided so that this disclosure is thorough and complete. That is, it will be obvious to one of ordinary skill in the art that various modifications may be made based on the technical scope of the present disclosure. Also, embodiments of the present disclosure may be combined and implemented. For example, parts of an embodiment and another embodiment of the present disclosure may be combined with each other. Also, embodiments of the present disclosure may also be applied to an LTE system, a 5G or NR system, etc., and other modifications based on the technical scope of the embodiments of the present disclosure may be made.

The inevntion claimed is:

1. A method performed by a first terminal in a wireless communication system, the method comprising:
    receiving, from a base station, a radio resource control (RRC) message comprising information for reporting sidelink channel state information (CSI);
    receiving, from the base station, downlink control information used for scheduling of a sidelink comprising a sidelink control channel and a sidelink data channel;
    transmitting, based on the RRC message and sidelink control information (SCI), a sidelink channel state information-reference signal (CSI-RS) to a second terminal; and
    receiving, from the second terminal, a report of the sidelink CSI based on the sidelink CSI-RS and the SCI,
    wherein the sidelink CSI-RS is transmitted in resource blocks used for the sidelink data channel.

2. The method of claim 1, wherein the sidelink CSI comprises a channel quality indicator (CQI) and a rank indicator (RI).

3. The method of claim 1, wherein the resource blocks used for the sidelink data channel is associated with the sidelink control channel.

4. The method of claim 1, wherein the sidelink CSI-RS is transmitted within the sidelink data channel for a unicast communication.

5. A method performed by a second terminal in a wireless communication system, the method comprising:
    receiving, from a first terminal, a sidelink channel state information-reference signal (CSI-RS) based on sidelink control information (SCI) and a radio resource control (RRC) message comprising information for reporting sidelink channel state information (CSI) transmitted to the first terminal from a base station; and
    reporting, to the first terminal, the sidelink CSI based on the sidelink CSI-RS and the SCI,
    wherein the sidelink CSI-RS is received in resource blocks used for a sidelink data channel.

6. The method of claim 5, wherein the sidelink CSI comprises a channel quality indicator (CQI) and a rank indicator (RI).

7. The method of claim 5, wherein the resource blocks used for the sidelink data channel is associated with a sidelink control channel.

8. The method of claim 5, wherein the sidelink CSI-RS is transmitted within the sidelink data channel for a unicast communication.

9. A first terminal in a wireless communication system, the first terminal comprising:
    a transceiver; and
    at least one processor coupled to the transceiver and configured to control to:
        receive, from a base station, a radio resource control (RRC) message comprising information for reporting sidelink channel state information (CSI),
        receive, from the base station, downlink control information used for scheduling of a sidelink comprising a sidelink control channel and a sidelink data channel,
        transmit, based on the RRC message and sidelink control information (SCI), a sidelink channel state information-reference signal (CSI-RS) to a second terminal, and
        receive a report of the sidelink CSI based on the sidelink CSI-RS and the SCI,
    wherein the sidelink CSI-RS is transmitted in resource blocks used for the sidelink data channel.

10. The first terminal of claim 9, wherein the sidelink CSI comprises a channel quality indicator (CQI) and a rank indicator (RI).

11. The first terminal of claim 9, wherein the resource blocks used for the sidelink data channel is associated with the sidelink control channel.

12. The first terminal of claim 9, wherein the sidelink CSI-RS is transmitted within the sidelink data channel for a unicast communication.

13. A second terminal in a wireless communication system, the second terminal comprising:
    a transceiver; and
    at least one processor coupled to the transceiver and configured to control to:
        receive, from a first terminal, a sidelink channel state information-reference signal (CSI-RS) based on sidelink control information (SCI), in case that a radio resource control (RRC) message comprising information for reporting sidelink channel state information (CSI) is transmitted to the first terminal from a base station, and
        report, to the first terminal, the sidelink CSI based on the sidelink CSI-RS and the SCI,
    wherein the sidelink CSI-RS is received in resource blocks used for a sidelink data channel.

14. The second terminal of claim 13, wherein the sidelink CSI comprises a channel quality indicator (CQI) and a rank indicator (RI).

15. The second terminal of claim 13, wherein the resource blocks used for the sidelink data channel is associated with a sidelink control channel.

* * * * *